(12) United States Patent
Yang et al.

(10) Patent No.: US 7,081,925 B2
(45) Date of Patent: Jul. 25, 2006

(54) METHOD AND APPARATUS FOR ADAPTING CHROMATIC COMPENSATION

(75) Inventors: Yanhua Yang, Beijing (CN); Ruihong Li, Beijing (CN)

(73) Assignees: Beijing Beida Huacai Technology Co., Ltd., Beijing (CN); Hong Kong Advanced Technology & Industrial Holdings Company Limited, Hong Kong (HK)

(*) Notice: Subject to any disclaimer, the term of this patent is extended or adjusted under 35 U.S.C. 154(b) by 530 days.

(21) Appl. No.: 10/275,843

(22) PCT Filed: May 11, 2001

(86) PCT No.: PCT/CN01/00734

§ 371 (c)(1),
(2), (4) Date: Jul. 24, 2003

(87) PCT Pub. No.: WO01/97530

PCT Pub. Date: Dec. 20, 2001

(65) Prior Publication Data

US 2004/0008283 A1    Jan. 15, 2004

(30) Foreign Application Priority Data

May 15, 2000   (CN) .............................. 00 1 07601

(51) Int. Cl.
*H04N 9/73* (2006.01)

(52) U.S. Cl. .................................. 348/655

(58) Field of Classification Search ............... 348/655, 348/656, 658, 645, 223.1, 225.1
See application file for complete search history.

(56) References Cited

U.S. PATENT DOCUMENTS

| | | | | |
|---|---|---|---|---|
| 5,213,918 A | * | 5/1993 | Donofrio | ..................... 430/23 |
| 5,241,374 A | * | 8/1993 | Yang et al. | .................. 348/655 |
| 5,262,848 A | * | 11/1993 | Kim | ......................... 348/223.1 |
| 5,485,202 A | * | 1/1996 | Ueda | ........................ 348/223.1 |
| 5,530,474 A | * | 6/1996 | Takei | ....................... 348/224.1 |
| 5,645,753 A | * | 7/1997 | Fukuoka et al. | ...... 252/62.9 PZ |
| 5,659,357 A | * | 8/1997 | Miyano | .................... 348/223.1 |
| 5,831,672 A | * | 11/1998 | Takei | ....................... 348/225.1 |
| 6,144,152 A | * | 11/2000 | Van Der Voort | ............ 313/486 |
| 6,522,353 B1 | * | 2/2003 | Saito et al. | .............. 348/223.1 |
| 6,744,464 B1 | * | 6/2004 | Huang | ......................... 348/182 |
| 6,788,339 B1 | * | 9/2004 | Ikeda | ....................... 348/223.1 |

FOREIGN PATENT DOCUMENTS

| | | |
|---|---|---|
| CN | 1059815 A | 3/1992 |
| JP | 64-046393 | 2/1989 |

* cited by examiner

*Primary Examiner*—Paulos M. Natnael
(74) *Attorney, Agent, or Firm*—Senniger Powers

(57) ABSTRACT

The present invention relates to a method and an apparatus for adaptive compensation of chrominance, aiming at the optimization of colors of electronic images. The invention includes the experimental data obtained when the best viewing effects are achieved, the division of color-gamut cells according to visual characteristics, the preset compensation characteristics that have different amplifications for different color-gamut cells, the real-time recognition of color-gamut cells that the signals belong to, and appropriate compensation that is done according to the color-gamut cells. The characteristic of the compensation is that each pixel gets its own amplification dynamically, which makes the dominant wavelength, chroma and relative brightness of all the image colors meet the requirement of best self-adaptive color reproduction automatically. As a result, colorful images with high qualities can be acquired. The present invention eliminates the local inferior chrominance distortion that inevitable for existing products and improves the equipment's adaptability to the receiving environments.

9 Claims, 5 Drawing Sheets

METHOD AND APPARATUS FOR ADAPTING CHROMATIC COMPENSATION

FIELD OF THE INVENTION

The present invention relates to a method and apparatus for adaptive compensation of chrominance, aiming at the comprehensive optimization of colors of electronic images. With this apparatus built in imaging equipments, appropriate chrominance compensation can be realized for different colorful images, thus the dominant wavelength, chroma and relative brightness of each color can automatically adapt to the requirement of the best reproduction of colors. And colorful images with high qualities can be acquired. Prior imaging equipments can not give consideration to the reproducing effects of all kinds of colors. Inferior chrominance distortion always occurs in some color gamuts. The present invention resolves these problems so that the optimization of colors is realized in the whole color gamut. Moreover, the present invention improves the ability to tolerate the chrominance deviation of the signals and thus improves the adaptability to the receiving environment.

BACKGROUND OF THE INVENTION

The color processing systems of prior imaging equipments, such as color TVs or computer monitors originally use a static white balance as the standard to determine the proportion of primary colors. According to the standard stipulation, pick-up cameras use a standard white of D65 with a correlated color-temperature of 6500K. Theoretically, in order to avoid the distortion of color reproduction, displaying equipments should also use a standard white of D65. However, products designed and calibrated according to this standard have the following problems: objects with white or negative colors do not have satisfying visual effects; green plants look withered; sky appears gray and dark. Customers are not satisfied with the total effects with bad clarity and faded images.

In order to resolve above problems, manufacturers put forward many methods. According to the references searched and the practice by manufacturers, there are mainly several technologies designed and applied as follows:

Calibration aiming at some certain colors that are extremely unsatisfactory. For example, in 1976 RCA company announced an integrated circuit for automatic adjusting of complexion in the journal of IEEE Transaction of Consumer Electronics. The circuit allowed viewers manually rectify complexion through the adjusting of the phase of color sub-carrier. This circuit was not popularized. SONY company's European patent (patent number EP0172754) brought forward a "color calibrating circuit". Its main point lies in the emphasis on the blue color in white signals, which makes white objects look beautiful. This circuit is applied in the top-grade products of SONY company and Panasonic company.

To calibrate white balance as much as possible. Some calibrations also give consideration to the effects of environmental light. The examples are the U.S. Pat. No. 4,709,262, SONY company's European patent numbered GB2149267 and Japanese patent numbered from JP62268289 to JP62268292, Fuji company's European patent numbered EP322791 and some recent automatic white balance adjusting circuits using bus-mastering.

A popular method now is that setting a white reference which may deviate from the accurate chrominance value, but deliver a more satisfying viewing effect. In this case, all images are partial to the same color hue. Nearly all the existing products use a white reference that is different from the one used by pick-up equipments. Most of color TVs and computer monitors use a static white reference between 9300K and 11500K as white balance. This kind of technical proposal makes all the images in a status of chrominance distortion. This distortion can improve the effects of color reproduction for white or some colorful objects, but at the same time obviously degrade the effects of color reproduction for some other colors. And this degradation is an unacceptable inferior chrominance distortion for some images. For instance, when using some white reference with high color-temperature, say 9300K, the percentages of green primary-color and blue primary-color are much larger than their accurate values in the images displayed by the equipments. Thus, complexion looks yellow or dark green and objects with warm colors, such as flowers, clothes, vessels and buildings lose their original vivid colors.

At the present time, however, most manufacturers and users abandoned the standard white of $D_{65}$ that does not introduce distortion. Instead, they turned to such standard with higher color-temperature, which causes distortion for all the colors. The reason lies in that the latter gives more images with better viewing effects than the former does, though it's far from being perfect. The development mentioned above shows that the best reproduction of colors is not definitely the one that never introduces any distortion in the measurement of chrominance, but the one that is full of genuine and beautiful images in terms of viewing effects. The problems in pursuing the best reproduction of colors are not just the problems about chrominance. The different combinations of color hue, chroma and relative brightness bring different feelings to people. In addition to physical stimulation, the factors impacting feelings of colors also include psychological and physiological mechanisms. For instance, the feeling of truthfulness is affected by contrast effect of apposition colors and also by whether or not the colors of the images are matching the colors of people's memory. And the feeling of beautifulness is affected by the color-preference law. Thus, the best effects can only be acquired by combination of physical factors and non-physical factors. Prior arts give no consideration to the non-physical factors mentioned above. Therefore, viewers do not definitely feel best even for many color images that are exactly reproduced in terms of chrominance measurement. There is another kind of product allowing users to manually adjust color hues by remote controllers or switch knobs. No matter which point it goes, the final effect is that the whole image is partial to the same color hue and not all the aspects can be taken care of.

Furthermore, prior art's capability to tolerate chrominance deviations is relatively limited. During the production and transmission of image signals, deviations are not avoidable. As mentioned above, existing technologies cannot make all images stay in the best reproducing status. Some reproduced objects even lie in the area of inferior chrominance distortion or around the limit of acceptable quality. Thus, the color effects get remarkably worse even if a small deviation of chrominance signal occurs. As a result, equipments' ability to tolerate deviations is not good.

In a word, after years of efforts by manufacturers, existing products still have the following disadvantages in common: the reproduction of all kinds of objects can not be accordingly taken care of in the images displayed; inferior chrominance distortion can not be completely eliminated; the ability to tolerate chrominance deviations is relatively limited.

The purpose of the present invention is to provide a method and apparatus for adaptive compensation of chrominance, eliminate inferior chrominance distortion and make all the images displayed by imaging equipments meet the requirements that the best color reproduction can be achieved automatically. At the same time, equipments' ability to tolerate chrominance deviations can be improved.

For the sake of convenience, we provide as follows some definitions and explanations:

The following symbols are used to indicate the output primary-color voltages and their proportion coefficients for the circuit that is sitting before video amplification circuits or matrix circuits in the original equipments: $E_r$ is voltage of red primary-color; $E_g$ is voltage of green primary-color and $E_b$ is voltage of blue primary-color. r is voltage proportion coefficient for red primary-color; g is voltage proportion coefficient for green primary-color and b is voltage proportion coefficient for blue primary-color, where $r=E_r/(E_r+E_g+E_b)$, $g=E_g/(E_r+E_g+E_b)$ and $b=E_b/(E_r+E_g+E_b)$.

We construct rgb chromaticity diagram by setting r as abscissa and g as ordinate. Each point in rgb chromaticity diagram corresponds to one point in CIE chromaticity diagram. This relation can be acquired through calculation using chrominance formulas or by measurement. For instance, we can make a color TV with $D_{65}$ white balance to display color images with chromaticity coordinates of (x,y). After measurement of $E_r$, $E_g$ and $E_b$, coordinates of (r,g) can then be calculated using above mentioned equations. Above voltage signals of primary colors, namely $E_r$, $E_g$ and $E_b$, correspond to point F in rgb chromaticity diagram (see FIG. 4) and also point F in CIE chromaticity diagram (see FIG. 3).

All the colors that can be reproduced by the imaging equipment correspond to a certain region in CIE chromaticity diagram and rgb chromaticity diagram. This region can be divided into a series of small regions, called color-gamut cells. If j represents the serial number of a color-gamut cell, then $U_j$ indicates that cell. For each color-gamut cell, there is a color representing its chrominance characteristic. This color is called chrominance sample. The chrominance sample of color-gamut cell $U_j$ is marked as ($S_{cj}$). Chrominance sample ($S_{cj}$) corresponds to point $S_{cj}$ in rgb chromaticity diagram (see FIG. 4) and also point $S_{cj}$ in CIE chromaticity diagram (see FIG. 3). The total number of color-gamut cells is N. At $D_{65}$ white balance, the signal from the equipment that corresponds to chrominance sample ($S_{cj}$) is called chrominance sample signal ($S_{cj}$). After optimizing treatment, the chrominance sample signal ($S_{cj}$) becomes a new imaging color, called optimized color of chrominance sample ($S_{CEj}$).

We sample all the actual objects that can be represented by the colors of each color-gamut cell and these sampled objects are called actual-object samples. The signals obtained by picking up of these samples with camera are called signals of actual-object samples. The signals of actual-object samples belonging to the color-gamut cell $U_j$ are input into the equipment. At $D_{65}$ white balance, the image displayed by the equipment is called original image of actual-object sample, ($S_{Oj}$). If the equipment is using an optimized white balance $D_E$ and it is also in $D_E$ white balance status, the image displayed now is called common image of actual-object sample, ($S_{OCj}$). If the equipment is in $D_E$ white balance status and the signals are given adaptive compensation, the image displayed is called optimized image among the actual-object samples, ($S_{OEj}$).

BRIEF SUMMARY OF THE INVENTION

The purpose of the present invention is achieved in the following way: according to the experimental data acquired from the best viewing effects, we preset different compensation characteristics in the compensation means for different color-gamut cells divided by visual characteristics. Compensation means can recognize in real time the color-gamut cell the signal belongs to and then optimized chrominance compensation is done accordingly. The characteristic of this compensation is that each pixel gets its own amplification dynamically, which makes the whole image and all images meet the requirement of best adaptive color reproduction. Consequently, color images with high qualities are obtained. A more detailed description is as follows.

After real-time recognition of primary-color voltages $E_r$, $E_g$ and $E_b$ in the signals of original equipment, these voltages are compensated according to a preset adaptive corresponding relation and compensation parameters. In this way, chrominance compensation of colorful images is achieved. Here are the procedures:

In CIE chromaticity diagram and rgb chromaticity diagram, all the colors that can be reproduced by the equipment are divided into T color-gamut cells, according to certain multiple of the size of MacAdam ellipse. They are small regions, like rectangle 46, whose sides are parallel to r axis and g axis respectively in rgb chromaticity diagram. Coordinates of four vertexes of color-gamut cell $U_j$ are $(r_{j1}, g_{j1})$, $(r_{j1}, g_{j2})$, $(r_{j2}, g_{j1})$ and $(r_{j2}, g_{j2})$. The color represented by the central point of color-gamut cell $U_j$ is determined to be the chrominance sample ($S_{Cj}$) of this cell.

For each color-gamut cell, we acquire as many actual-object samples as possible so that these samples are sufficiently representative.

These actual-object samples are reproduced in several testing equipments according to different chrominance characteristics, namely, color hues, chroma, brightness and background. The viewing effect of these images are contrasted and evaluated. Based on the experimental results, the best color reproduction of the actual-object samples are chosen for all color-gamut cells and optimized white reference $D_E$ is determined. When using $D_E$ as white reference for white balance, images displayed by the equipment become optimized images. We now test the changes of pertinent parameters, including optimized dominant wavelength, optimized chroma and optimized chrominance parameters, namely, optimized chromaticity coordinates ($x_{CEj}$, $y_{CEj}$) of chrominance sample ($S_{cj}$) in color-gamut cell $U_j$ and optimized brightness compensation coefficient $c_{yj}$ for color-gamut cell $U_j$. We test parameters mentioned above for all color-gamut cells. We set optimized compensation coefficients $c_{rj}$, $c_{gj}$ and $c_{bj}$ for primary-color voltages in products based on the standard of $D_E$ and the criterion used is the realization of the optimized chrominance parameters mentioned above. The possible values of j are all the serial numbers for all the T color-gamut cells. The definitions and measurement methods of above parameters will be described in the following detailed explanation.

An adaptive chrominance compensation mechanism is added in the original equipment. The coordinates of all color-gamut cells, $(r_{j1}, g_{j1})$, $(r_{j1}, g_{j2})$, $(r_{j2}, g_{j1})$ and $(r_{j2}, g_{j2})$ are acquired in advance and set with an appropriate format into location controllers in the compensation means. The optimized compensation coefficients $c_{rj}$, $c_{gj}$ and $c_{bj}$ are acquired in advance and set with an appropriate format into compensator. The relationship between coordinates and optimized compensation parameters is expressed by the serial number j of color-gamut cell and predetermined by the design of connections of wires inside the compensation means.

In the product design plan, $D_E$ is selected as white reference for white balance. The adaptive chrominance compensation means mentioned above is installed between the input end of video amplification circuits or matrix circuits in the original equipments and output end of previous circuit. This adaptive chrominance compensation means will treat the input primary-color voltages $E_r$, $E_g$ and $E_b$ in real time. Recognition-voltage generator in the compensation means will convert $E_r$, $E_g$ and $E_b$ into signal coordinates (r, g) and then send it to each location controller. Location controllers will then compare (r, g) with the coordinates of color-gamut cells that kept in their memories. After recognizing the color-gamut cell $U_j$ that the input signal belongs to, a turn-on signal is output and corresponding compensators $c_{rj}$, $c_{gj}$ and $C_{bj}$ is turned on to optimize the input signal. After compensation, the outputs of the compensation means are $(E_r + C_{rj}E_r)$ for red-primary-color voltage, $(E_g + C_{gj}E_g)$ for green-primary-color voltage and $(E_b + C_{bj}E_b)$ for blue-primary-color voltage.

One of the purposes of the present invention is to provide an adaptive chrominance compensation method for the optimizing treatment of color images of electronic equipments, according to real-time recognition of primary-color voltages $E_r$, $E_g$ and $E_b$ in the signals of original equipment and the location of color-gamut cells they belong to, voltage compensation is then performed based on the preset adaptive corresponding relations and compensation parameters, so as to achieve the chrominance compensation for imaging colors, wherein said method comprising the following steps:

dividing all the colors that can be reproduced by the equipment into T color-gamut cells, according to certain multiples of the size of Macadam Ellipse, in CIE chromaticity diagram and rgb chromaticity diagram, selecting the color represented by the central point of color-gamut cell as the chrominance sample ($S_{Cj}$) of this cell, and stipulating a white color-gamut cell $U_1$ as the cell whose chrominance sample is white light $D_{65}$ with correlated color-temperature 6500K+18MPCD;

acquiring actual-object samples and signals of actual-object samples that can reflect the color characteristics in the predetermined area of the cell for each color-gamut cell;

reproducing the same actual-object sample on the screens of testing equipments according to different chrominance characteristics, namely, color hues, chroma, brightness and background, carrying out the test for contrasting and evaluating the viewing effect of the images and choosing the most optimized image as the best color reproduction image of the actual-object sample; choosing the best image of color reproduction ($S_{OEj}$) from the optimized images of all the actual-object samples in the cell $U_j$ according to some predetermined rules; choosing the best image of color reproduction for each color-gamut cell in the same way; and using the optimized color of chrominance sample ($S_{OE1}$) that represents the best image of color reproduction in white color-gamut cell $U_1$ as optimized white reference $D_E$ for white balance;

testing the optimized compensation coefficients of primary-color voltages when the common image of actual-object sample ($S_{OCj}$) in color-gamut cell $U_j$ is converted into the optimized image among the actual-object samples ($S_{OEj}$) under the status of white balance $D_E$, wherein said coefficients are increasing rate $c_{rj}$ for red-primary-color voltage, increasing rate $c_{gj}$ for green-primary-color voltage and increasing rate $c_{bj}$ for blue-primary-color voltage and measuring the optimized compensation coefficients of primary-color voltages for all the T color-gamut cells;

setting the relationship of the optimized converting functions, which correspond to those optimized compensation coefficients of T groups of primary-color voltages, into fiducial-voltage generators or fiducial memories according to pre-acquired parameters of optimized white reference $D_E$ and said optimized compensation coefficients of each color-gamut cell, and performing adaptive compensation for each color-gamut cell according to these optimized converting functions and different-amplification; recognizing the stochastic imaging signals received by the equipment in real time firstly and locating said signal to the color-gamut cell they belong to, in the application of the equipment, and then performing voltage compensation basing on preset optimized converting functions for this color-gamut cell.

According to the adaptive chrominance compensation method of the present invention, each of said T color-gamut cells is a small rectangular area whose sides are parallel to r axis and g axis of rgb chromaticity diagram.

According to the adaptive chrominance compensation method of the present invention, said test for contrasting and evaluating the viewing effect of the images further comprising the following steps:

having viewers to watch and remember the relative actual objects or original images before they take the contrast and evaluation test on the different images of the actual-object samples reproduced on equipment screens;

only selecting those images that approximately match with the viewers' memory colors as the candidates for the best image, and giving pleasure grades to each candidate, after the viewers watched the different images of the actual-object samples reproduced on the screen;

comparing each image with all other images that belong to the same color-gamut cell, and giving higher grade to the one that viewers feel more beautiful in every two comparing images;

selecting one of the images as the best image of color reproduction ($S_{OEj}$) for color-gamut cell $U_j$ from all the optimized images of actual-object samples in that color-gamut cell, according to the following preset rule: the image selected by this plan accords with the common accepted conclusions made by multiple disciplines such as psychology and physiology; it meets the requirements that correction needs to be done in order to eliminate the affections of contrast effect of apposition colors; the chrominance deviation of this plan is in the range of the preset acceptable errors; in addition to the above requirements, the image receives the highest grades during each comparison of pleasure grade.

According to the adaptive chrominance compensation method of the present invention, said different-amplification adaptive compensation in each color-gamut cell comprises at least two different parameters' optimized converting.

The other purpose of the present invention is to provide an adaptive chrominance compensation apparatus, which can optimize imaging colors of electronic equipments, according to real-time recognition of primary-color voltages $E_r$, $E_g$, $E_b$ in the signals of original equipment and the location of color-gamut cells they belong to, voltage compensation is then performed based on the preset adaptive corresponding relations and compensation parameters, so as to achieve the chrominance compensation for imaging colors, wherein said apparatus comprising:

a color-gamut cells dividing and actual-object samples locating means for dividing all the colors that can be reproduced by the equipment into T color-gamut cells in CIE chromaticity diagram and rgb chromaticity diagram, according to certain multiple of the size of Macadam Ellipse, establishing the relationship between the primary-color voltages $E_r$, $E_g$, $E_b$ of any signals and the color-gamut cell they belong to, locating this actual-object sample into the color-gamut cell it belongs to automatically according to the recognition results of each actual-object sample's primary-color voltages $E_r$, $E_g$ and $E_b$, and thus acquiring and storing the actual-object samples and their signals that can reflect the color characteristics in the predetermined area of the color-gamut cell;

a testing means for comparing, selecting and testing the actual-object samples for each and every color-gamut cell, so as to acquire the best image of color reproduction and optimized compensation coefficients for primary-color voltages for all the T color-gamut cells.

a compensation means for recognising in real time the primary-color voltages $E_r$, $E_g$, $E_b$ of stochastic imaging signals received by the electronic equipment and locating them automatically into the color-gamut cell they belong to according to said corresponding relationship between signal's primary-color voltages $E_r$, $E_g$, $E_b$ and the color-gamut cell they belong to as well as the corresponding relationship between color-gamut cell and optimized compensation coefficients, and performing the different-amplification adaptive compensation for each said color-gamut cell according to said optimized converting functions of relative color-gamut cell.

According to the adaptive chrominance compensation apparatus of the present invention, each of said T color-gamut cells is a small rectangular area whose sides are parallel to r axis and g axis of rgb chromaticity diagram.

According to the adaptive chrominance compensation apparatus of the present invention, said different-amplification adaptive compensation in each color-gamut cell comprises at least two different parameters' optimized converting.

According to the adaptive chrominance compensation means of the present invention, said compensation means comprises several compensators that are corresponding to all the optimized compensation coefficients.

According to the adaptive chrominance compensation apparatus of the present invention, said compensation means also comprises:

an input circuit comprising transistors $P_{r1}$, $P_{r2}$, $P_{g1}$, $P_{g2}$, $P_{b1}$, $P_{b2}$ and resistors $R_{r1}$, $R_{g1}$, $R_{b1}$ for inputting the signals such as primary-color voltages $E_r$, $E_g$, $E_b$ or color-minus-monochrome voltages (($E_r$-Y), ($E_g$-Y), ($E_b$-Y)), and inputting this group of signals into primary-color-voltage generator and one end of each voltage-superposed resistor;

a zero-reference-voltage generator for converting the input black-level signal or brightness signal into a zero-reference-voltage signal with the same amplitude as that of the zero-level of primary-color voltages and then sending it to primary-color-voltage generator;

a primary-color-voltage generator for converting the input signal comprising primary-color voltages or color-minus-monochrome voltages and zero-reference-voltage into an accurate primary-color-voltage signal by subtraction operation and sending this primary-color voltage to recognition-voltage generator and each compensator;

a recognition-voltage generator for converting the input primary-color-voltage signal into a group of recognition signals with the information of proportions of primary colors and then sending them to each location controller;

location controllers comprising fiducial-voltage generators or fiducial memories, comparison units and recognition units, which will compare the input recognition signals with the preset or pre-stored fiducial voltage, for locating the color-gamut cell $U_j$ to which this primary color proportion signal belongs according to the corresponding relationship between the primary color proportions and the color-gamut cell, and then corresponding location controllers outputting controlling signals and turning on a group of compensators that belong to the located color-gamut cell $U_j$, in which the outputs of this group of compensators are red-primary-color compensation current with value of $c_{rj}E_r/R_{r2}$, green-primary-color compensation current with value of $c_{gj}E_g/R_{g2}$ and blue-primary-color compensation current with value of $c_{bj}E_b/R_{b2}$, voltage-superposed resistors, comprising resisters $R_{r2}$, $R_{g2}$ and $R_{b2}$, getting a compensated red-primary-color voltage ($E_r$+$c_{rj}E_r$) at the end of resistor $R_{r2}$ where the output circuit is connected, by adding a compensation voltage $c_{rj}E_r$ across resistor $R_{r2}$ created by red-primary-color compensation current with said signal $E_r$ from the input circuit; getting a compensated green-primary-color voltage ($E_g$+$c_{gj}E_g$) at the end of resistor $R_{g2}$ where the output circuit is connected, by adding a compensation voltage $c_{gj}E_g$ across resistor $R_{g2}$ created by green-primary-color compensation current with said signal $E_g$ from the input circuit; and getting a compensated blue-primary-color voltage ($E_b$+$c_{bj}E_b$) at the end of resistor $R_{b2}$ where the output circuit is connected, by adding a compensation voltage $c_{bj}E_b$ across resistor $R_{b2}$ created by blue-primary-color compensation current with said signal $E_b$ from the input circuit;

an output circuit comprising transistors $N_r$, $N_g$, $N_b$ and resistors $Rr_3$, $R_{g3}$, $R_{b3}$, forming three emitter-followers, outputting said compensated primary-color voltages.

BRIEF DESCRIPTION OF THE DRAWINGS

We will discuss the implementation of the present invention with the help of the attached figures in detail. The foregoing and other objects and advantages of this invention will be more fully understood from the following description of an illustrated embodiment thereof taken in conjunction with the accompanying drawings.

DETAILED DESCRIPTION

Now we will explain the method and apparatus that are going to be used.

Figure 3:
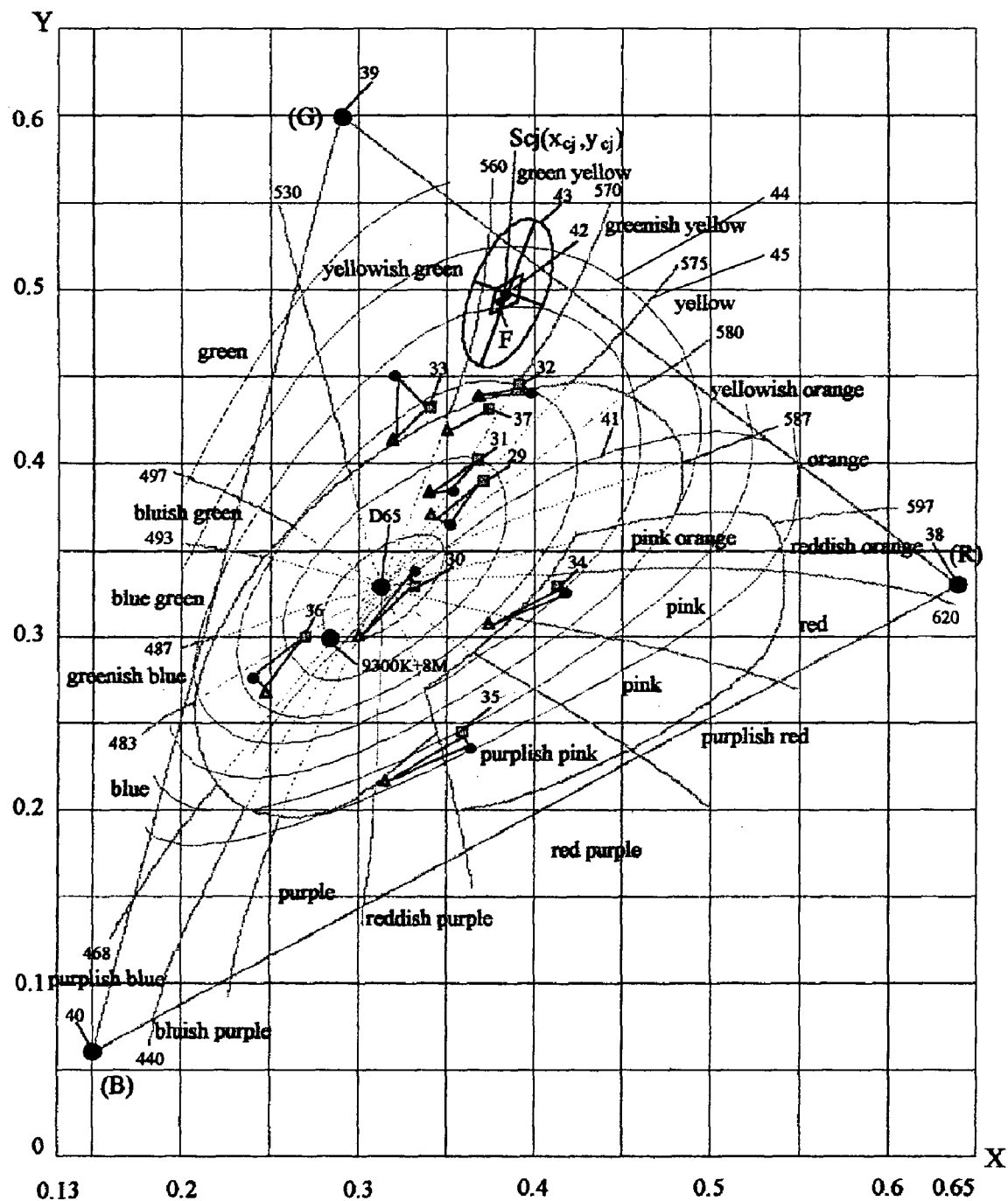
FIG. 3 indicates the method for dividing of color-gamut cells and shows the chromaticity diagram that indicating the difference among several colorful imaging signals before and after the chrominance compensation when the adaptive chrominance compensation method is carrying out.

When it comes to the chromatics tools, please refer to FIG. 3. The close curve, like 44, in this CIE-XYZ chromaticity diagram represents the constant chroma locus loop in Munsell color system, where the smallest elliptical curve indicates chroma in the second degree, which means the colors represented by the points in the curve have chroma in the second degree. The curves next to it in succession are chroma locus loops with the $4^{th}$, $6^{th}$, $8^{th}$, $10^{th}$ and $12^{th}$ degree. The radiating curves in the chromaticity diagram, like 45, represent constant color hue loci which divide the chromaticity diagram into different color areas. The numbers at their ends represent the wavelengths (in nm) of spectral colors that correspond to the intersection points of constant color hue locus and spectral color curves. Curve 41 is Planckian locus. Any point in the chromaticity diagram corresponds to a color with chromaticity coordinates (x, y), where point 38 represents red primary-color R with chromaticity coordinates (0.64, 0.33); point 39 represents green primary-color G with chromaticity coordinates (0.29, 0.60); point 40 represents blue primary-color B with chromaticity coordinates (0.15, 0.06). The triangle connecting points 38, 39 and 40 indicates all the colors that can be reproduced by the equipment.

Figure 4:
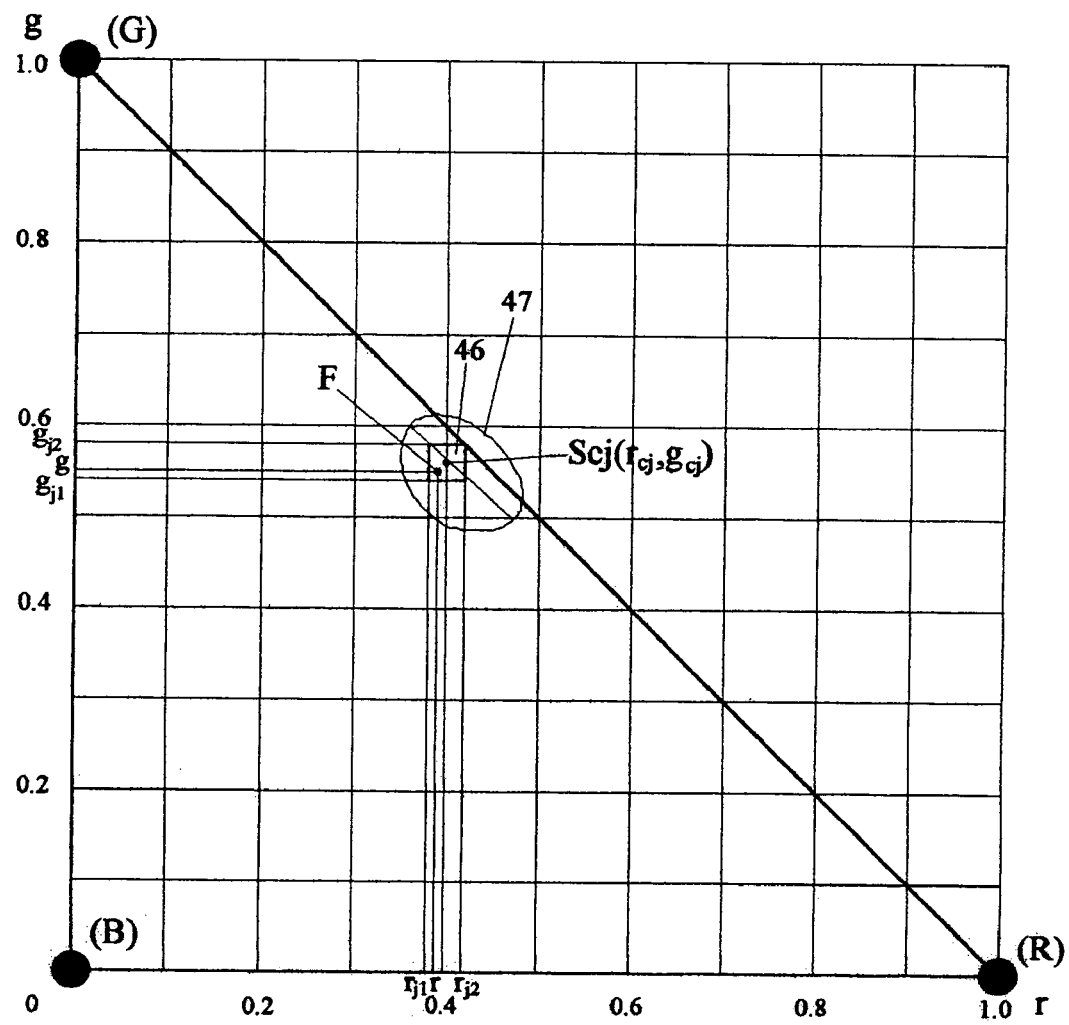
FIG. 4 is the rgb chromaticity diagram, which indicates the locations of colorful imaging signals and the color-gamut cells they belong to when compensation means is implemented.

Please refer to FIG. 3 and FIG. 4 about the method of dividing color-gamut cells. Color-gamut cells are small regions, like rectangle 46 in rgb chromaticity diagram, which are acquired by the division of primary color triangle according to some certain rule. They also correspond to small regions like quadrangle 42 in CIE chromaticity diagram. Color-gamut cells are obtained by the following method: according to chromatics calculation equations and coordinates of each MacAdam ellipse (including ellipse 43) in the CIE chromaticity diagram and its long and short axes, we draw all the corresponding MacAdam ellipses and their long and short axes in the rgb chromaticity diagram. Ellipse 47 is corresponding to MacAdam ellipse 43. As an example, these two ellipses in the chromaticity diagram s are drawn ten times larger than their original sizes. In rgb chromaticity diagram, we acquire the primary color triangle RGB by connecting point R with coordinates (1,0) and representing pure-red-primary-color voltage proportion, point G with coordinates (0,1) and representing pure-green-primary-color voltage proportion, and point B with coordinates (0,0) and representing pure-blue-primary-color voltage proportion. All the points in this triangle are in accordance with all the colors that can be reproduced by the equipment. Starting from around origin point, we divide color-gamut cells one by one in the rgb chromaticity diagram, using the following method: we split the primary color triangle RGB using straight lines that are parallel to r axis and the spacing between two adjacent lines is such size as certain times of relative MacAdam ellipse of the color-gamut cell along the direction of g axis. Then we split the primary color triangle RGB using straight lines that are parallel to g axis and the spacing between two adjacent lines is such size as certain times of relative MacAdam ellipse of the color-gamut cell along the direction of r axis. As a result, we can divide the mentioned primary color triangle into T rectangles and number them. Each rectangle represents a color-gamut cell. Rectangle 46 represents an arbitrary color-gamut cell $U_j$ numbered j. The coordinates of its four vertexes are $(r_{j1},g_{j1})$, $(r_{j1},g_{j2})$, $(r_{j2},g_{j1})$ and $(r_{j2},g_{j2})$, where $r_{j2}$ is larger than $r_{j1}$ and $g_{j2}$ is larger than $g_{j1}$. We find the points in CIE chromaticity diagram that are corresponding to the four vertexes of the mentioned color-gamut cell $U_j$ and draw a quadrangle 42 in the CIE chromaticity diagram that is corresponding to the color-gamut cell $U_j$. We draw all the color-gamut cells in CIE chromaticity diagram. When accurate design is required, the lengths of sides of quadrangle 42 in accordance with the distances $(r_{j2}-r_{j1})$ and $(g_{j2}-g_{j1})$ of rectangle 46 are equal to the size of relative MacAdam ellipse 43. When accurate design is not required, the distances mentioned above can be as large as two or several times of the size of relative MacAdam ellipse 43. We select the color $(S_{cj})$ as the chrominance sample of this color-gamut cell $U_j$, where the color $S_{cj}$ is represented by the chrominance point in the center of quadrangle 42 with coordinates of $(x_{coj}, y_{coj})$ and also by the point at the center of rectangle 46 with coordinates of $(r_{coj}, g_{coj})$. Each color-gamut cell needs one chrominance sample. The relative MacAdam ellipse of some color-gamut cell mentioned above is stipulated as follows: in rgb chromaticity diagram, the distance from the central point of this color-gamut cell to the intersection of the long and short axes of this ellipse is smaller than the distances from the central point of this color-gamut cell to the intersection of the long and short axes of any other ellipses. The size of MacAdam ellipse that relative to a color-gamut cell is stipulated as the following: along the direction of r axis, it's the length of a chord that is parallel to the r axis and also going through the intersection of long and short axes; along the direction of g axis, it's the length of a chord that is parallel to the g axis and also going through the intersection of long and short axes.

Figure 2:
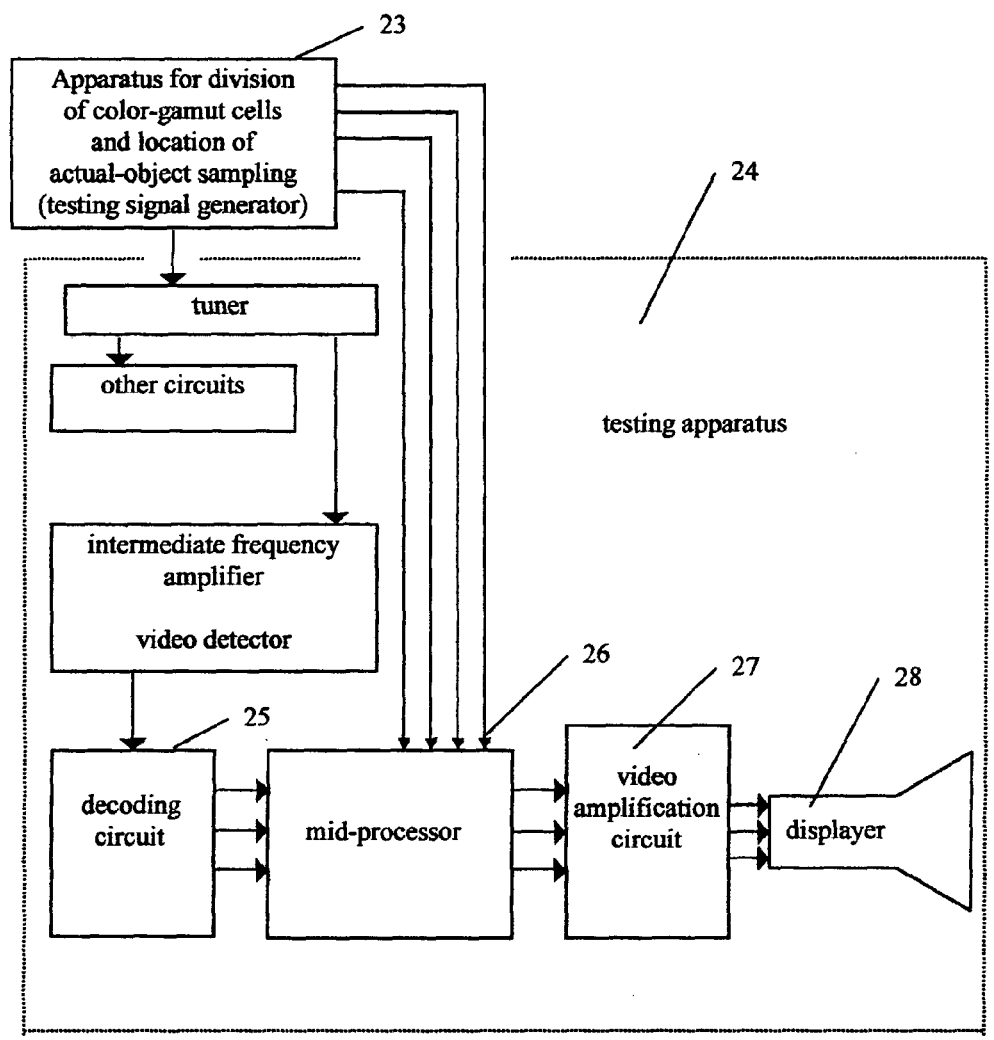
FIG. 2 shows the test for contrasting and evaluating the viewing effect of the images, sketch maps of orientation apparatus for actual object sampling and testing apparatus, and also the connection between these apparatuses.

Please refer to FIG. 2 about the apparatus for division of color-gamut cells and location of actual-object sampling, namely, testing signal generator 23. This apparatus consists of pickup camera, chromaticity instrument, computer, and software for division of color-gamut cell, generation of testing signals and location of actual object sampling. When writing the software, we use the same method mentioned above to split the color-gamut cells. The functions of the apparatus are: splitting color-gamut cells according to the requirements mentioned above, establishing memory unit for each color-gamut cell; creating chrominance sample signal for the relative color are unit according to the result of division of color-gamut cells, creating monochromatic testing signals that start from this chrominance sample, which have the same color and same brightness in the whole screen and which have adjustable chrominance and brightness parameters in the whole color area; shooting the actual-object samples, processing the outline of the signals of actual-object samples and locating them to the relative color-gamut cells, numbering the signals of actual-object samples and storing them into the preconcerted memories accordingly; shooting all kinds of backgrounds, locating the background signals into the relative color-gamut cells, numbering the background signals and storing them into the preconcerted memories accordingly. There are two kinds of output status for testing signal generator 23. One is to output either chrominance sample signals or monochromatic testing signals. The second one is to output two signals at the same time. One channel outputs signals of actual-object samples (using the same output port with the channel that output the monochromatic testing signals mentioned above) and the other channel outputs changeable background signals and their recognition signals for actual-object samples.

Please refer to FIG. 2 for testing apparatus 24. This apparatus can be reconstructed from N color TVs whose decoding circuits are primary-color voltage output circuits, according to the requirements of FIG. 2. Mid-processor 26 is inserted between the output end of decoding circuit 25 and the input end of video amplification circuit 27 in the TV. The magnification of red-primary-color voltage Kr, the magnification of green-primary-color voltage Kg and the magnification of blue-primary-color voltage Kb are coming from decoding circuit 25 and can be adjusted and displayed by mid-processor 26. The adjusting range is from 0.5 to 2. When the magnification is less than 1, it means the signal is being attenuated. The word "magnification" in the following text will specially indicate the magnifications of primary-color voltages from decoding circuit 25 mentioned above. Mid-processor 26 will not magnify or attenuate the input background signals. Mid-processor 26 has the following functions: it will embed the signals of actual-object samples input from previous circuit in the background signals coming from testing signal generator 23 and output the treated signals. If there is no specific explanation, the testing apparatus should be in the following standard working status: the magnification is 1 after signals pass through mid-processor 26. The standard white is D65 for white balance. The apparatus is under standard working status that meets the requirements of the relative standard. For instance, when testing TVs with PAL-D standard that used in Chinese market, we should make the testing apparatus working under a status that meets the requirements of Chinese standard, namely, "measurement methods of TV broadcasting receivers".

Please refer to FIG. 2 for the connection of the apparatus for division of color-gamut cells and location of actual-object sampling, namely, testing signal generator 23 and testing apparatus 24. Under the first output status, chrominance sample signals or monochromatic testing signals from the testing signal generator 23 are sent to the input end of testing apparatus 24. Under the second output status, the output signals of actual-object samples are sent to the input end of testing apparatus 24, while the output background signals of actual-object samples and their recognition signals are sent to mid-processor 26 directly. Corresponding to the two kinds of output status of testing signal generator 23 mentioned above, mid-processor 26 also has two kinds of working status. When testing signal generator 23 is under the first status mentioned above, mid-processor 26 is also under its first status such that the magnified or attenuated chrominance sample signals are output directly. When testing signal generator 23 is under the second status mentioned above, mid-processor 26 is otherwise under its second status such that the magnified or attenuated chrominance sample signals are embedded into the background signals coming from testing signal generator 23 mentioned above and the output signals now are the ones with the treatment of embedding.

In the following text, we will discuss in details about the procedure that how adaptive chrominance compensation of the image colors of electronic equipments is realized by using the adaptive chrominance compensation apparatus and how the optimization treatment is completed.

Please refer to FIG. 2, FIG. 3 and FIG. 4 about the division of color-gamut cells by using the apparatus for division of color-gamut cells and location of actual-object sampling 23. According to the requirement of color displaying precision by the equipment, we select relative multiple of MacAdam ellipse size as the distance for division of color-gamut cells and we preset this distance into apparatus 23. This apparatus will run the software program foe division of color-gamut cells as mentioned above so that T color-gamut cells are split automatically and numbered. These color-gamut cells look like quadrangle 42 in CIE chromaticity diagram and rectangle 46 in rgb chromaticity diagram. The color $S_{cj}$ that represented by point $(x_{coj}, y_{coj})$ in the central region of color-gamut cell 42 and also by point $(r_{coj}, g_{c\ j})$ in the central region of color-gamut cell 46 is selected as chrominance sample for color-gamut cell $U_j$ that represented by the quadrangle and the rectangle. Among them, the color-gamut cell whose chrominance sample is white light D65 with correlated color-temperature 6500K+18MPCD, is stipulated as white color-gamut cell $U_1$.

We select actual-object samples and their backgrounds that can reflect the color characteristics in the predetermined area of each color-gamut cell and then acquire the signals of actual-object samples and background signals. For each color-gamut cell, we select a group of actual scenery as shooting objectives whose colors have the relative positions within the color-gamut cell. These objectives are called actual-object samples. The relative backgrounds are also selected. When selecting actual-object samples and their backgrounds, we have to consider the difference caused by different conditions, such as all kinds and types, shooting in doors or out doors, different time and different seasons, for all the possible actual objects and backgrounds in each color-gamut cell. So that the actual-object samples and their backgrounds mentioned above can represent all possible scenes. Under standard status, we shoot the actual-object samples and their backgrounds mentioned above, using the apparatus for division of color-gamut cells and location of actual-object sampling 23. The obtained TV signals are signals of actual-object samples for this color-gamut cell. After processing their outlines and locating them to the relative color-gamut cells by apparatus 23, the signals are stored in the predetermined memories.

The next experiment is to compare and evaluate the viewing effects of images and to measure each optimizing parameter. The experiment for comparison and evaluation of the viewing effects of images is completed by the apparatus for division of color-gamut cells and location of actual object-sampling, namely, testing signal generator 23 and testing apparatus 24, with the help of CIE chromaticity diagram (see FIG. 3) and rgb chromaticity diagram (see FIG. 4) that have constant color hue loci and chroma locus loops. Certain numbers of viewers for the experiment mentioned above are selected from people with normal vision, after they are trained necessarily according to the requirements of the following experiment. These viewers will watch and evaluate all kinds of images under stipulated experimental conditions and then select several best images for each color-gamut cell. Based on their evaluation results, technologists will select the best image of color reproduction for each color-gamut cell, according to the research results of multiple disciplines. Through the analysis of common images and the best images, all the optimized color parameters are determined. Detailed method is discussed as follows.

Make mid-processor 26 of the testing apparatus 24 under a status that the magnification is one. The testing apparatus is calibrated to ensure a $D_{65}$ white balance status. We input the signal of the actual-object sample and the image displayed by the displayer 28 of the testing apparatus under this condition is called the original image of the actual-object sample. During all the following experiments, all kinds of testing images will be compared with this original color image.

The experiment is done to compare and evaluate the viewing effects of different color reproduction images for all the actual-object samples that displayed by the testing apparatus. This is a double-blind test, which means neither the workers who take part in the evaluation of viewing effects nor the viewers know the working status of each testing apparatus. The experiment is done for each color-gamut cell one by one.

The experiment mentioned above is carried out for white color-gamut cell U1 first. The method is as follows: We firstly let viewers watch and remember the actual scenery or the original image of the actual-object sample for this color-gamut cell. Under the condition that all the values of magnifications of mid-processor 26, namely, Kr, Kg and Kb are one, we calibrate the white balance of N−2 apparatus among the testing apparatus mentioned above, according to different white reference. The white balance of the other two apparatus is kept under $D_{65}$ status. Then we input the signals of actual-object samples and background signals of white color-gamut cell into all the testing apparatus. These N images will be watched, compared and evaluated by the viewers and then graded according to their satisfying degrees, following the grading rules mentioned before. Select A (A can be 3~5) images with the highest grades. Keep the white balance of the A testing apparatus that displaying these A images unchanged, while adjust the white balance of other testing apparatus and make their standard white parameters to be the middle value of the relative parameters of the A testing apparatus mentioned above. Change background signals and start a new cycle of experiment. Repeat above experiment until we select several images with the highest grades in terms of satisfying degree. According to the predetermined rules mentioned before, technologists select the image with the best color reproduction of actual-object sample from those images with the highest grades in terms of satisfying degree. The standard white used for the white balance of the apparatus that displays this image is determined to be the optimized color of chrominance sample ($S_{CE1}$) of white color-gamut cell $U_1$ and also selected to be the optimized standard white $D_E$ for white balance.

Then above experiment is done for color-gamut cells of non-white scenery. The method is as follows: we firstly let viewers watch and remember the actual scenery or the original image of the actual-object sample for the color-gamut cell $U_j$. Under the condition that all the values of magnifications of mid-processor 26, namely, Kr, Kg and Kb are one, we calibrate the white balance of N−2 apparatus among the above testing apparatus to be the optimized standard white $D_E$. The other two testing apparatus are still kept under the status of $D_{65}$ white balance. Among the N−2 apparatus, we always keep two of them under the condition that all the values of magnifications of mid-processor 26, namely, Kr, Kg and Kb are one. The images displayed by these two testing apparatus are called common images, ($S_{ocj}$). Other N−4 testing apparatus are adjusted to N−4 kinds of different working status. The detailed method is as follows: Aiming at the actual-object sample we are going to test, we design N−4 plans for the setting of dominant wavelength transforming value, chroma transforming value and brightness transforming value for the color-gamut cell $U_j$, referring the known law of favorite colors and using CIE chromaticity diagram with constant hue locus of Munsell color system and its dominant wavelength and chroma locus. Each plan corresponds to the coordinates of a group of chrominance points and a brightness value. The transforming values of the above parameters indicate their deviations from the values of relative parameters in the original color image. For instance, if the dominant wavelength of the color in the original image is 560 nm for the chrominance sample (Scj) of color-gamut cell Uj and the dominant wavelength transforming value preset by the experimental plan is −4 nm, then the contrasting experiment is done by transforming the image with dominant wavelength of 560 nm into an image with dominant wavelength of 556 nm. Input chrominance sample signals. Adjust the above N−4 testing apparatus so that they are separately in N−4 working status of the above plans, by changing the amplifications Kr, Kg and Kb of mid-processor 26. We keep the above mentioned working status of each of these N apparatus unchanged and input the actual object sample signal and the background signal of color-gamut cell $U_j$ so that each testing apparatus will reproduce the actual-object sample with different combinations of color hue, chroma, brightness and background. And different color reproduction images are obtained. These N images will be watched and evaluated by the viewers in a double-blind experiment and then graded according to their satisfying degrees, following the grading rules mentioned before. Select B (B can be 3~5) images with the highest grades. Keep the working status of the B testing apparatus that displaying these B images unchanged, while adjust the amplifications of mid-processors of other testing apparatus and make their dominant wavelength transforming values, chroma transforming values and brightness transforming values to be the middle values of the relative parameters of the B testing apparatus mentioned above. Referring to the known rules of contrast effect of apposition colors, change background signals and start a new cycle of double-blind experiment to evaluate viewing effects. Repeat above experiment until we select several images of this actual-object sample with the highest grades in terms of satisfying degree. The whole procedure mentioned above is repeated for all the actual-object samples in this color-gamut cell. Following the same method, crossing experiment is done within actual-object samples in order to give comprehensive consideration. The above crossing experiment means under the working status that corresponds to the image with the highest grades in one color-gamut cell, input sample signals of other color-gamut cells for testing. According to the predetermined rules mentioned before, technologists select the best image of color reproduction ($S_{OEj}$) of the actual-object sample in the color-gamut cell from the images with the highest grades in terms of satisfying degree. Record the amplifications $K_{rEj}$, $K_{gEj}$ and $K_{bEj}$ of mid-processor 26 when the testing apparatus is displaying the optimized image ($S_{OEj}$) as mentioned above. When color-gamut cell $U_j$ is under the status of $D_E$ white balance, we calculate the optimized compensation coefficients of primary-color voltages, namely, increasing rate $c_{rj}$ for red-primary-color voltage, increasing rate $c_{gj}$ for green-primary-color voltage and increasing rate $c_{bj}$ for blue-primary-color voltage by the following equations: $c_{rj}=K_{rEj}-1$, $c_{gj}=K_{gEj}-1$, $c_{bj}=K_{bEj}-1$. Thes coefficients are needed to transform the common image ($S_{ocj}$) of the actual-object sample into the optimized image ($S_{OEj}$) of the above actual-object sample.

Test optimized transforming values of other parameters. Since human eyes can not tell the hue difference or chroma difference of two colors expressed by any two chrominance points inside a MacAdam ellipse and geometry parameters of adjacent MacAdam ellipses are similar, we can say that the colors in each of the above color-gamut cell arouse the same feeling in terms of vision. Therefore, the chrominance sample of above color-gamut cell can represent all the colors corresponding to all other points in this unit when we carry out the viewing experiment of color reproduction and relative testing. Because the chrominance sample signals and their waveforms are very regular, their images on the displayer are monochromatic and uniform. Therefore, the signals of actual-object samples are replaced by the chrominance sample signals during the testing as mentioned above. This replacement is convenient and reasonable. Moreover, the testing precision is improved.

Detailed method is as follows: make testing apparatus 24 under D65 white balance, i.e. the status of displaying the original image ($S_{oj}$) of the actual-object sample, and change the input of testing apparatus 24 into the chrominance sample signal of color-gamut cell $U_j$. At this time, we measure the parameters of the image displayed by the displayer 28 of testing apparatus, i.e. original color chromaticity coordinates ($x_{cj}$, $y_{cj}$) and brightness $Y_{cj}$ of the chrominance sample. Make testing apparatus 24 under the foresaid status of displaying the common image ($S_{ocj}$), and change the input of testing apparatus 24 into the chrominance sample signal of color-gamut cell $U_j$. At this time, we measure the parameters of the image displayed by the displayer 28 of testing apparatus, i.e. common color chromaticity coordinates ($x_{c\ j}$, $y_{coj}$) and brightness $Y_{coj}$ of the chrominance sample under $D_E$ white balance. Maintain the working status of testing apparatus 24 that corresponding to the foresaid best image, and change the input of testing apparatus 24 into the chrominance sample signal of color-gamut cell $U_j$. At this time, we measure the color of the image displayed by the displayer 28 of testing apparatus and call it optimized color of the chrominance sample ($S_{CE1}$); we measure chromaticity coordinates ($x_{CEj}$, $y_{CEj}$) and brightness $Y_{CEj}$ of the image on the screen. ($x_{CEj}$, $y_{CEj}$) is called optimized chromaticity coordinates of the chrominance sample ($S_{Ej}$) in the color-gamut cell $U_j$. $c_{yj}=(Y_{CEj}-Y_{COj})/Y_{COj}$ and $c_{Yj}$ is called optimizing brightness compensation coefficient of the color-gamut cell $U_j$. According to above the original color chromaticity coordinates ($x_{cj}$, $y_{cj}$) and optimized chromaticity coordinates ($x_{CEj}$, $y_{CEj}$), we draw the corresponding points on the CIE chromaticity diagram with constant hue locus of Muncell color system and its dominant wavelength and chroma locus. Thus, after the best transformation of dominant wavelength and the best transformation of chroma, we calculate the changes of dominant wavelength and chroma from their original values of original color image and stipulate them as the best dominant wavelength transforming value and the best chroma transforming value. ($x_{CEj}$, $y_{CEj}$) and $c_{Yj}$ are called optimized chrominance parameters of color-gamut cell $U_j$. From above description and the following implement example, we can see that in the adaptive chrominance compensation method and compensation apparatus of the present invention, the mentioned different-amplification adaptive compensation in each color-gamut cell 46 includes at least two different parameters' optimized converting.

In the following text, we will detaiiediy describe the construction and function of the compensation means that realize the foresaid adaptive chrominance compensation method.

Figure 1:
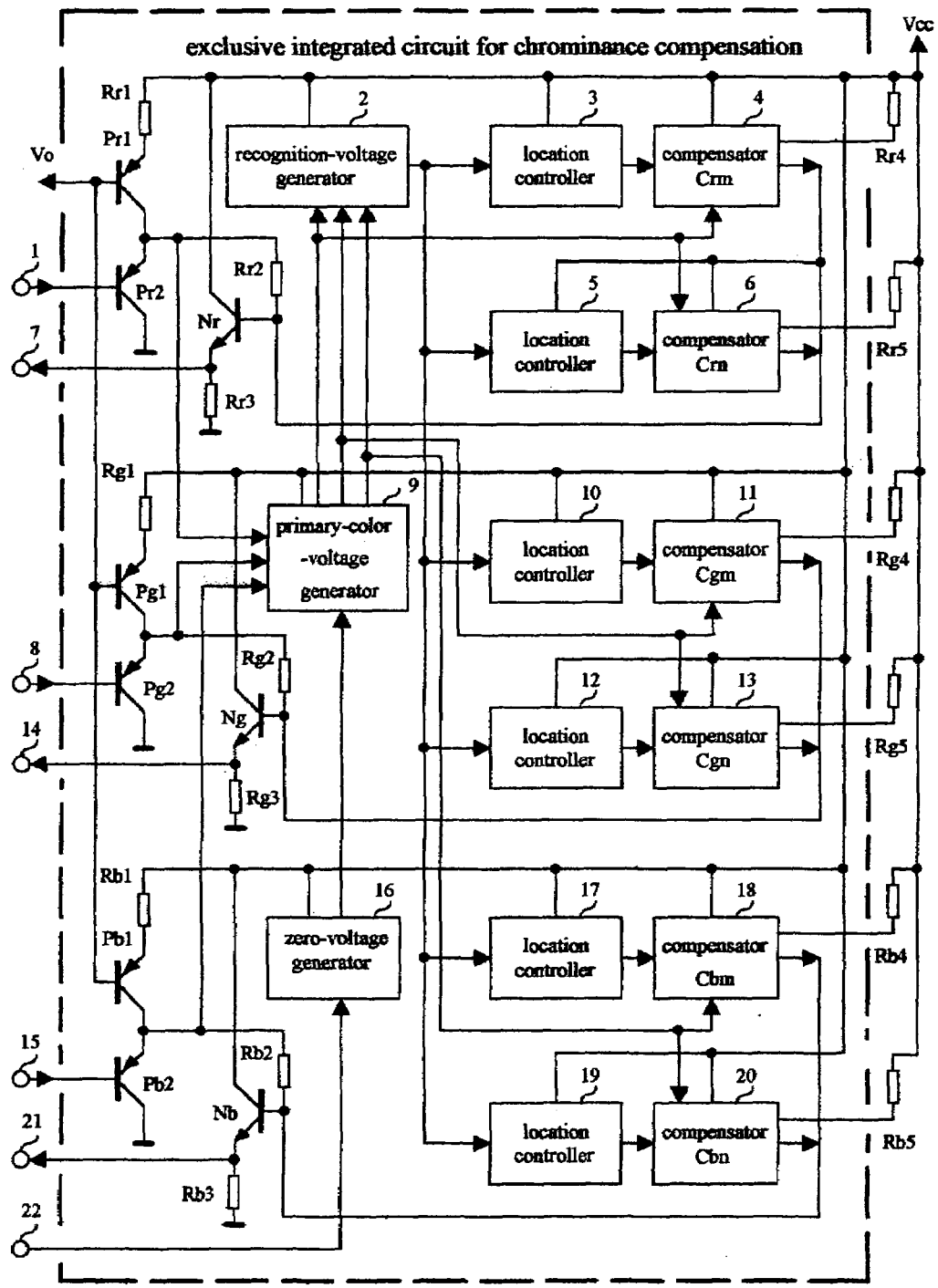
FIG. 1 is the system chart indicating the electrical principle of adaptive chrominance compensation apparatus (include compensation means) when it is implemented.

Please refer to FIG. 1. The compensating means consists of an exclusive integrated circuit for chrominance compensation and its peripheral circuit components, which are printed on the circuit board. And the aforesaid IC comprises of the input circuit, output circuit, voltage-superposed resistor, zero-reference-voltage generator, primary-color-voltage generator, recognition-voltage generator and a series of controllers and compensators. Each color-gamut cell $U_j$ corresponds to a compensator group that is formed by three compensators, i.e. the red-primary-color voltage compensator $C_{rj}$ with a compensating coefficient $c_{rj}$, the green-primary-color voltage compensator $C_{gj}$ with a compensating coefficient $c_{gj}$ and the blue-primary-color voltage compensator $C_{bj}$ with a compensating coefficient $c_{bj}$. The values of the compensating coefficients of the above compensators can be revised by adjusting the values of the compensation coefficient adjusting resistors that connected with the relative compensators. When the compensation coefficient of one color-gamut cell is equivalent to that of another color-gamut cell, the two cells can share the same compensator. All of the above compensators have high output impedance. According to their functions, above input circuit, output circuit, voltage-superposed resistor, location controllers and compensators can be divided into three groups, where chrominance compensation circuit of red signals includes input circuit consisting of transistors $P_{r1}$, $P_{r2}$ and resister $R_{ri}$, output circuit consisting of transistor $N_r$ and resister $R_{r3}$, voltage-superposed resister $R_{r2}$, compensator 4 numbered $C_{rm}$, compensator 6 numbered $C_{rn}$ and other compensators, and compensation coefficient adjusting resistors $R_{r4}$ and $R_{r5}$ in the peripheral circuit; chrominance compensation circuit of green signals includes input circuit consisting of transistors $P_{g1}$, $P_{g2}$ and resister $R_{gi}$, output circuit consisting of transistor $N_g$ and resister $R_{g3}$, voltage-superposed resister $R_{g2}$, compensator 11 numbered $C_{gm}$, compensator 13 numbered $C_{gn}$ and other compensators, and compensation coefficient adjusting resistors $R_{g4}$ and $R_{g5}$ in the peripheral circuit; chrominance compensation circuit of blue signals includes input circuit consisting of transistors $P_{b1}$, $P_{b2}$ and resister $R_{bi}$, output circuit consisting of transistor $N_b$ and resister $R_{b3}$, voltage-superposed resister $R_{b2}$, compensator 18 numbered $C_{bm}$, compensator 20 numbered $C_{bn}$ and other compensators, and compensation coefficient adjusting resistors $R_{b4}$ and $R_{b5}$ in the peripheral circuit. The above integrated circuit also includes recognition-voltage generator 2, primary-color-voltage generator 9, zero-reference-voltage generator 16, location controllers 3, 5, 10, 12, 17 and 19, and other location controllers. The characteristics are as follows. The base of the transistor $P_{r1}$ is given a static bias voltage $V_0$. Its emitter is connected to resister $R_{r1}$. Its collector is connected to the emitter of $P_{r2}$. The base of $P_{r2}$ is connected to the input end 1. Its collector is connected to ground. Its emitter is connected to the first input end of primary-color-voltage generator 9 and also to the resistor $R_{r2}$. The other end of $R_{r2}$ is connected to the base of transistor $N_r$. The emitter of $N_r$ is connected to output end 7 and also to resister $R_{r3}$. Its collector is connected to the other end of resister $R_{r1}$ and also to source $V_{cc}$. The other end of resister $R_{r3}$ is connected to the ground. The base of the transistor $P_{g1}$ is given a static bias voltage $V_0$. Its emitter is connected to resister $R_{g1}$. Its collector is connected to the emitter of $P_{g2}$. The base of $P_{g2}$ is connected to the input end 8. Its collector is connected to ground. Its emitter is connected to the second input end of primary-color-voltage generator 9 and also to the resistor $R_{g2}$. The other end of $R_{g2}$ is connected to the base of transistor $N_g$. The emitter of $N_g$ is connected to output end 14 and also to resister $R_{g3}$. Its collector is connected to the other end of resister $R_{g1}$ and also to source $V_{cc}$. The other end of resister $R_{g3}$ is connected to ground.

The base of the transistor $P_{b2}$ is connected to input end 15. Its collector is connected to ground. Its emitter is connected to the third input end of primary-color-voltage generator 9 and also to the resistor $R_{b2}$. The other end of $R_{b2}$ is connected to the base of transistor $N_b$. The emitter of $N_b$ is connected to output end 21 and also to resistor $R_{b3}$. Its collector is connected to the other end of resister $R_{b1}$ and also to source $V_{cc}$. The other end of $R_{b3}$ is connected to ground. The input end of zero-reference-voltage generator is connected to input end 22, while the output end is connected to the fourth input end of primary-color-voltage generator 9. The first output end of primary-color-voltage generator 9 is connected to the first input end of recognition-voltage generator 2 and the first input ends of compensators 4 and 6; The second output end of primary-color-voltage generator 9 is connected to the second input end of recognition-voltage generator 2 and the first input ends of compensators 11 and 13; The third output end of primary-color-voltage generator 9 is connected to the third input end of recognition-voltage generator 2 and the first input ends of compensators 18 and 20. The output end of recognition-voltage generator 2 is connected to the input ends of location controllers 3, 5, 10, 12, 17 and 19. The output end of location controller 3 is connected to the second input end of compensator 4; The output end of location controller 5 is connected to the second input end of compensator 6; The output end of location controller 7 is connected to the second input end of compensator 8; The output end of location controller 10 is connected to the second input end of compensator 11; The output end of location controller 12 is connected to the second input end of compensator 13; The output end of location controller 17 is connected to the second input end of compensator 18; The output end of location controller 19 is connected to the second input end of compensator 20. The output ends of compensators 4 and 6 are connected to the base of transistor $N_r$. Compensator 4 is also connected to the compensation adjusting resister $R_{r4}$ in the peripheral circuit. Compensator 6 is also connected to the compensation adjusting resister $R_{r5}$ in the peripheral circuit. The output ends of compensator 11 and 13 are connected to the base of transistor $N_g$. Compensator 11 is also connected to the compensation adjusting resister $R_{g4}$ in the peripheral circuit. Compensator 13 is also connected to the compensation adjusting resister $R_{g5}$ in the peripheral circuit. The output ends of compensators 18 and 20 are connected to the base of transistor $N_b$. Compensator 18 is also connected to the compensation adjusting resister $R_{b4}$ in the peripheral circuit. Compensator 20 is also connected to the compensation adjusting resister $R_{b5}$ in the peripheral circuit. The other ends of $R_{r4}$, $R_{r5}$, $R_{g4}$, $R_{g5}$, $R_{b4}$ and $R_{b5}$ are connected to source $V_{cc}$. The input end 1 of the compensation circuit is connected to the output end of red-primary-color signal or color-minus-monochrome signal of the previous circuit, such as the decoding circuit; the input end 8 of the compensation circuit is connected to the output end of green-primary-color signal or color-minus-monochrome signal of the previous circuit, such as the decoding circuit; The input end 15 of the compensation circuit is connected to the output end of blue-primary-color signal or color-minus-monochrome signal of the previous circuit, such as the decoding circuit. When the output of the decoding circuit connected to the compensation circuit is a primary color signal, we output a black-voltage level signal from end 22; when the output of the decoding circuit connected to the compensation circuit is a color-minus-monochrome signal, we output a brightness signal from end 22. The signal containing red-primary-color voltage $E_r$ that input from end 1 is sent to the first input end of primary-color-voltage generator 9 and one end of $R_{r2}$ by the emitter follower $P_{r2}$; the signal containing green-primary-color voltage $E_g$ that input from end 8 is sent to the second input end of primary-color-voltage generator 9 and one end of $R_{g2}$ by the emitter follower $P_{b2}$; The signal containing blue-primary-color voltage $E_b$ that input from end 15 is sent to the third input end of primary-color-voltage generator 9 and one end of $R_{b2}$ by the emitter follower $P_{b2}$. zero-reference-voltage generator 16 outputs a zero-reference-voltage signal mentioned above to the fourth end of primary-color-voltage generator 9. Primary-color-voltage generator 9 produces a group of signals containing only primary-color voltages $E_r$, $E_g$ and $E_b$. Following above connections, these signals are sent separately from the first, the second and the third output ends to the first ends of recognition-voltage generator and each compensator. If there is no opening signal sent to the second input end of a compensator, its first input end is closed. Recognition-voltage generator 2 produces a group of recognition signals and sends them to each location controller. Location controllers will recognize the color-gamut cell $U_j$ that the above primary-color voltages $E_r$, $E_g$ and $E_b$ belong to and then one or a group of relative opening signals are produced and sent to the second input end of each compensator, where they will open and only open compensators $C_{rj}$, $C_{gj}$, $C_{bj}$ and the primary-color voltages sent to the first ends of these compensators are allowed to pass. When j is equal to m (j=m), compensator 4 numbered $C_{rm}$, compensator 11 numbered $C_{gm}$, and compensator 18 numbered $C_{bm}$ are opened, while other compensators are closed. The primary-color-voltage signal that is allowed to pass compensator 4 is converted to a compensation current $I_{rm}$ ($I_{rm}=c_{rm}E_r/R_{r2}$) by this compensator. Current $I_{rm}$ is sent to the end of the voltage-superposed resister $R_{r2}$ where the base of transistor $N_r$ is connected. A compensation voltage $c_{rm}E_r$ is created across resister $R_{r2}$ when current $I_{rm}$ goes through it. The compensation voltage $c_{rm}E_r$ is then superposed to the primary-color voltage $E_r$ that coming from the other end. The resulted voltage ($E_r+c_{rm}E_r$) is output from end 7 through transistor $N_r$. The primary-color-voltage signal that is allowed to pass compensator 11 is converted to a compensation current $I_{gm}$ ($I_{gm}=c_{gm}E_g/R_{g2}$) by this compensator. Current $I_{gm}$ is sent to the end of the voltage-superposed resister $R_{g2}$ where the base of transistor $N_g$ is connected. A compensation voltage $c_{gm}E_g$ is created across resister $R_{g2}$ when current $I_{gm}$ goes through it. The compensation voltage $c_{gm}E_g$ is then superposed to the primary-color voltage $E_g$ that coming from the other end. The resulted voltage ($E_g+c_{gm}E_g$) is output from end 14 through transistor $N_g$. The primary-color-voltage signal that is allowed to pass compensator 18 is converted to a compensation current $I_{bm}$ ($I_{bm}=c_{bm}E_b/R_{b2}$) by this compensator. Current $I_{bm}$ is sent to the end of the voltage-superposed resister $R_{b2}$ where the base of transistor $N_b$ is connected. A compensation voltage $c_{bm}E_b$ is created across resister $R_{b2}$ when current $I_{bm}$ goes through it. The compensation voltage $c_{bm}E_b$ is then superposed to the primary-color voltage $E_b$ that coming from the other end. The resulted voltage ($E_b+c_{bm}E_b$) is output from end 21 through transistor $N_b$. When j is equal to n (j=n), compensator 6 numbered $C_{rn}$, compensator 13 numbered $C_{gn}$, and compensator 20 numbered $C_{bn}$ are opened, while other compensators are closed. The primary-color-voltage signal that is allowed to pass compensator 6 is converted to a compensation current $I_{rn}$ ($I_{rn}=c_{rn}E_r/R_{r2}$) by this compensator. Current $I_{rn}$ is sent to the end of the voltage-superposed resister $R_{r2}$ where the base of transistor $N_r$ is connected. A compensation voltage $c_{rn}E_r$ is created across resister $R_{r2}$ when current $I_{rn}$ goes through it. The compensation voltage $c_{rn}E_r$ is then superposed to the primary-color voltage $E_r$ that coming from the other end. The resulted voltage $(E_r+c_{rn}E_r)$ is output from end 7 through transistor $N_r$. The primary-color-voltage signal that is allowed to pass compensator 13 is converted to a compensation current $I_{gn}$ ($I_{gn}=c_{gn}E_g/R_{g2}$) by this compensator. Current $I_{gn}$ is sent to the end of the voltage-superposed resister $R_{g2}$ where the base of transistor $N_g$ is connected. A compensation voltage $c_{gn}E_g$ is created across resister $R_{g2}$ when current $I_{gn}$ goes through it. The compensation voltage $c_{gn}E_g$ is then superposed to the primary-color voltage $E_g$ that coming from the other end. The resulted voltage $(E_g+c_{gn}E_g)$ is output from end 14 through transistor $N_g$. The primary-color-voltage signal that is allowed to pass compensator 20 is converted to a compensation current $I_{bn}$ ($I_{bn}=c_{bn}E_b/R_{b2}$) by this compensator. Current $I_{bn}$ is sent to the end of the voltage-superposed resister $R_{b2}$ where the base of transistor $N_b$ is connected. A compensation voltage $c_{bn}E_b$ is created across resister $R_{b2}$ when current $I_{bn}$ goes through it. The compensation voltage $c_{bn}E_b$ is then superposed to the primary-color voltage $E_b$ that coming from the other end. The resulted voltage $(E_b+c_{bn}E_b)$ is output from end 21 through transistor $N_b$.

Figure 5:
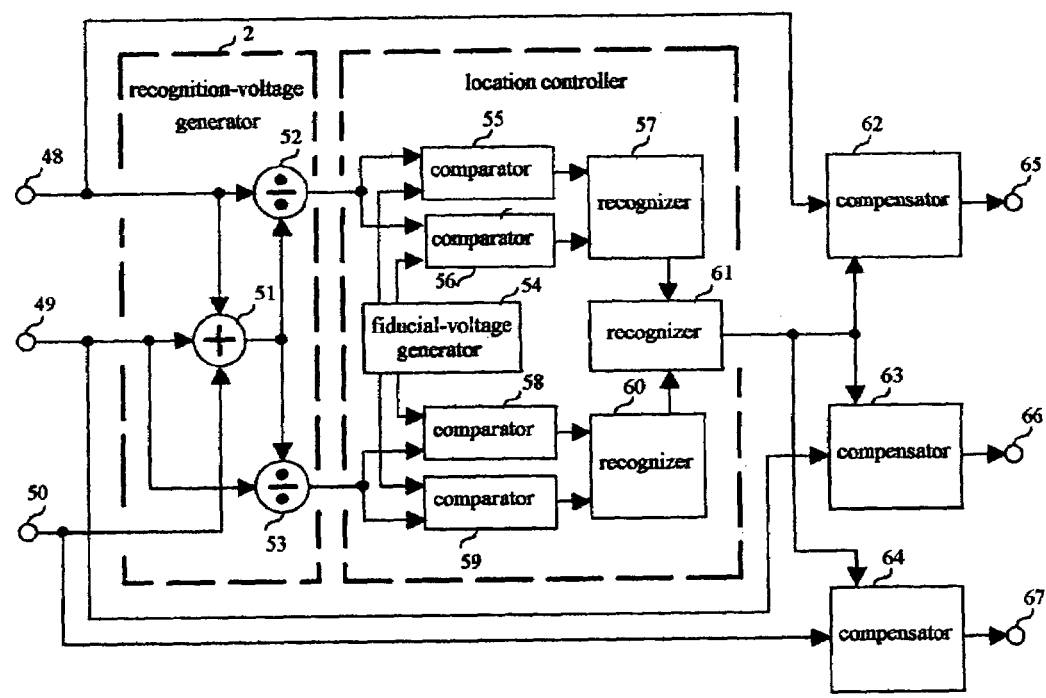
FIG. 5 is the system chart of electrical principle indicating the recognition-voltage generator, the location controller and a group of compensators when compensation means is implemented.

Please refer to FIG. 5, which is an example of the implementation of above compensation means. Its recognition-voltage generator 2 of the specialized IC for chrominance compensation consists of adder 51 and dividers 52, 53. Each of its location controllers consists of relative fiducial-voltage generator 54, comparators 55, 56, 58 and 59 and recognizers 57, 60, 61. The three input ends of adder 51 where the addends are input are connected to the first input end 48, the second input end 49 and the third input end 50 of recognition-voltage generator 2. The input end of divider 52 where the dividend is input is connected to the input end 48, while the input end of divider 53 where the dividend is input is connected to the input end 49. The input ends of divider 52 and 53 where the divisors are input are connected to the output end of adder 51. The output end of divider 52 is connected to one of the input ends of comparator 55 and that of comparator 56. The output end of divider 53 is connected to one of the input ends of comparator 58 and that of comparator 59. The four output ends of fiducial-voltage generator 54 are connected respectively to the other input ends of comparators 55, 56, 58 and 59. The output end of comparator 55 is connected to one input end of recognizer 57.The output end of comparator 56 is connected to the other input end of recognizer 57. The output end of comparator 58 is connected to one input end of recognizer 60. The output end of comparator 59 is connected to the other input end of recognizer 60. The output end of recognizer 57 is connected to one input end of recognizer 61. The output end of recognizer 60 is connected to the other input end of recognizer 61. The output end of recognizer 61 is connected to the second input ends of compensator 62, 63 and 64. The first input end of compensator 62 is connected to input end 48. Output end 65 is connected to the base of transistor $N_r$. The first input end of compensator 63 is connected to input end 49. Output end 66 is connected to the base of transistor $N_g$. The first input end of compensator 64 is connected to input end 50. Output end 67 is connected to the base of transistor $N_b$. The primary-color-voltage signal $E_r$ corresponding to the point (F) in the foresaid rgb chromaticity diagram is sent from input end 48 to one addend input end of adder 51, dividend input end of divider 52, and the first input end of compensator 62. The primary-color-voltage signal $E_g$ is sent from input end 49 to one addend input end of adder 51, dividend input end of divider 53, and the first input end of compensator 63. The primary-color-voltage signal $E_b$ is sent from input end 50 to one addend input end of adder 51, and the first input end of compensator 64. The resulted sum signal $(E_r+E_g+E_b)$ produced by adder 51 is sent to the divisor input ends of adders 52 and 53. The resulted quotient signal $r=E_r/(E_r+E_g+E_b)$ produced by divider 52 is sent separately to one input end of comparator 55 and that of comparator 56. The resulted quotient signal $g=E_g/(E_r+E_g+E_b)$ produced by divider 53 is sent separately to one input end of comparator 58 and that of 59. The fiducial voltages $r_{j1}$, $r_{j2}$, $g_{j1}$ and $g_{j2}$ produced by fiducial-voltage generator are sent to comparators 56, 55, 59 and 58, respectively. The recognition signals produced by comparators 55 and 56 are sent to recognizer 57, while the recognition signals produced by comparators 58 and 59 are sent to recognizer 60. The recognition signals produced by recognizer 57 and 60 are sent to recognizer 61. The recognition signals produced by recognizer 61 are sent to the second input ends of compensators 62, 63, 64. The recognition signals produced by compensator 62 are sent from output end 65 to the base of transistor $N_r$. The recognition signals produced by compensator 63 are sent from output end 66 to the base of transistor $N_g$. The recognition signals produced by compensator 64 are sent from output end 67 to the base of transistor $N_b$. The characteristics are as follows. According to some appropriate format, fiducial-voltage generator 54 presets the coordinates $r_{j1}$, $r_{j2}$, $g_{j1}$ and $g_{j2}$ of the color-gamut cell $U_j$. Compensator 62 presets the optimized compensation coefficient $c_{rj}$. Compensator 63 presets the optimized compensation coefficient $c_{gj}$. Compensator 64 presets the optimized compensation coefficient $c_{bj}$. When and only when r is less than $r_{j2}$, comparator 55 outputs an opening signal. When and only when r is larger than $r_{j1}$, comparator 56 outputs an opening signal. When and only when g is less than $g_{j2}$, comparator 58 outputs an opening signal. When and only when g is larger than $g_{j1}$, comparator 59 outputs an opening signal. When and only when all the input ends get opening signals, recognizers 57, 60 and 61, which have functions of AND gate, will output opening signals. When and only when the second input end gets opening signals, compensators 62, 63 and 64 will output opening signals. The output signal of compensator 62 is $c_{rj}E_r/R_{r2}$, when it's opened. The output signal of compensator 63 is $c_{gj}E_g/R_{g2}$, when it's opened. The output signal of compensator 64 is $c_{bj}E_b/R_{b2}$, when it's opened. The output of all the compensators is 0, when they are not opened. The above opening signals can be a high-level signal or a low-level signal.

Now we give a part of the implement of the adaptive chrominance compensation method and explain its active effects. The following items are included: a group of original color chromaticity coordinates $(x_{cj}, y_{cj})$ of the chrominance sample $(S_{cj})$ in color-gamut cell Uj; the best dominant wavelength transforming value and the best chroma transforming value of this color-gamut cell; the following optimizing parameters based on 9300K+8MPCD white balance: optimized chromaticity coordinates $(x_{CEj}, y_{CEj})$ of the chrominance sample $(S_{cj})$ and optimizing compensation coefficient $(c_{Yj})$ of brightness in color-gamut cell $U_j$. For products using EBU fluorescence powder, i.e. the chromaticity coordinates of red primary-color is (0.64, 0.33), the chromaticity coordinates of green primary-color is (0.29, 0.60), and the chromaticity coordinates of blue primary-color is (0.15, 0.06), we give the optimizing compensation coefficients of primary-color voltages $c_{rj}$, $c_{gj}$ and $c_{bj}$.

Please see FIG. 3, where the positions of points 29, 30, 31, 32, 33, 34, 35, 36 and 37 are shown. If taking the colors expressed by these points as the chrominance samples, we can get 9 color-gamut cells, which almost represent all kinds of compensation types. We use the above numbers as the numbers of these color-gamut cells in the following explanation. The squares in the figure are used to show the positions of the original color images of these points. After adaptive chrominance compensation, the color TV signals corresponding to the above points are transformed into new color images, whose chromaticity coordinates correspond to points indicated by dots. It's also shown in the figure the positions of new chromaticity coordinates of aforesaid color TV signals when they are displayed under the most popular 9300K+8MPCD white balance at present. These positions are indicated by triangles. We connect these three points of the same chrominance sample by straight lines. It's also shown the positions of standard white D65 and 9300K+8MPCD.

After the experiment of evaluation of viewing effects, we select the white light with correlated color-temperature 9300K+8MPCD as the optimized white $D_E$, whose c chromaticity coordinates is (0.284, 0.299).

The chrominance sample of the color-gamut cell that corresponds to point 29 is a shallow yellow color with 3.6 degrees of chroma. The chromaticity coordinates of original color is $(x_{c29}, y_{c29})$=(0.370, 0.390). The brightness is $Y_{c29}$=23 cd/m$^2$. The primary-color voltages of original color are $E_{rc29}$=1.54V, $E_{gc29}$=1.24V, $E_{bc29}$=0.62V. The actual-object samples in this color-gamut cell include some Chinese people's complexion that is a little bit yellowish, images of some certain kind of paper, fabric and architectures. After the experiment of evaluation of viewing effects, optimized chrominance parameters are determined. They are as follows: chromaticity coordinates is $(x_{CE29}, y_{CE29})$=(0350, 0.360); brightness is $Y_{CE29}$=23 cd/m$^2$; optimized primary-color voltages are $E_{rCE29}$=1.51V, $E_{gCE29}$=1.22V and $E_{bCE29}$=0.86V; optimized compensation coefficients are $c_{r29}$=0.15, $c_{g29}$=-0.03 and $c_{b29}$=0.02 (The red, green and blue primary-color voltages of 9300K plan are 1.31V, 1.26V and 0.83V, respectively); the optimized compensation coefficient of brightness is $c_{Y29}$=0. After compensation, optimized parameters are realized and the color reproduction effects are as follows: compared with the original color samples, dominant wavelength is increased by 3 nm; chroma is decreased by 1.6 degree; complexion tends to be ruddy and white; other actual-object samples looks newer. Instead, the 9300K plan has the following effects: dominant wavelength is decreased by 3 nm; reproduced colors tend to shift to greenish yellow color gamut from the yellow color. These effects are opposite to those of the optimized plan, which means the effects are worse. Especially, complexion looks yellow and green and the inferior chrominance distortion is very obvious.

The chrominance sample of the color-gamut cell that corresponds to point 30 is a shallow pink color with 1.2 degrees of chroma. The chromaticity coordinates of original color is $(x_{c30}, y_{c30})$=(0.332, 0.329). The brightness is $Y_{c30}$=26 cd/m$^2$. The primary-color voltages of original color are $E_{rc30}$=1.75V, $E_{gc30}$=1.47V and $E_{bc30}$=1.34V. The actual-object samples in this color-gamut cell include some White people's complexion that is a little bit purple, images of some certain kind of cartoon, paper, fabric and architectures. After the experiment of evaluation of viewing effects, optimized chrominance parameters are determined. They are as follows: chromaticity coordinates is $(x_{CE30}, y_{CE30})$=(0.332, 0.338); brightness is $Y_{CE30}$=26 cd/m$_2$; optimized primary-color voltages are $E_{rCE30}$=1.75V, $E_{gCE30}$=1.49V and $E_{bCE30}$=1.34V; optimized compensation coefficients are $c_{r30}$=0.12, $c_{g30}$=0.01 and $c_{b30}$=-0.30 (The red, green and blue primary-color voltages of 9300K plan are 1.56V, 1.45V and 1.91V, respectively.); the optimized compensation coefficient of brightness is $c_{Y30}$=0. After compensation, optimized parameters are realized and the color reproduction effects are as follows: compared with the original color samples, dominant wavelength is decreased by 9 nm; chroma is decreased just a little bit; the position of complexion chrominance point goes to above Planck locus from below it and the complexion changes to orange with a little bit of pink color from shallow pink with a little bit of purple; other actual-object samples looks newer. Instead, the 9300K plan has the following effects: dominant wavelength drifts to the opposite direction dramatically; reproduced colors shift from shallow pink with a little bit of purple to a color gamut of blue, purple and red with one degree higher in chroma. These effects are opposite to those of the optimized plan, which means the effects are worse. Complexion is purplish and the inferior chrominance distortion is very obvious.

The chrominance sample of the color-gamut cell that corresponds to point 31 is a greenish yellow color with 4 degrees of chroma. The chromaticity coordinates of original color is $(x_{c31}, y_{c31})$=(0.368, 0.402). The brightness is $Y_{c31}$=16 cd/m$^2$. The primary-color voltages of original color are $E_{rc31}$=1.00V, $E_{gc31}$=0.89V and $E_{bc31}$=0.39V. The actual-object sample in this color-gamut cell is an image of a Black people's complexion. After the experiment of evaluation of viewing effects, optimized chrominance parameters are determined. They are as follows: chromaticity coordinates is $(x_{CE31}, y_{CE31})$=(0.354, 0.384); brightness is $Y_{CE31}$=16 cd/m$^2$; optimized primary-color voltages are $E_{rCE31}$=0.98V, $E_{gCE31}$=0.89V and $E_{bCE31}$=0.50V; optimized compensation coefficients are $c_{r31}$=0.5, $c_{g31}$=-0.02 and $c_{b31}$=-0.05 (The red, green and blue primary-color voltages of 9300K plan are 0.85V, 0.91V and 0.52V, respectively.); the optimized compensation coefficient of brightness is $c_{Y31}$=0. After compensation, optimized parameters are realized and the color reproduction effects are as follows: compared with the original color samples, dominant wavelength is increased by 1 nm; chroma is decreased by 1 degree; complexion tends to be ruddy and white, close to accurate color reproduction. Instead, the 9300K plan has the following effects: dominant wavelength is decreased by 8 nm; reproduced colors shift from yellow color with green to a color gamut of greenish yellow. These effects are opposite to those of the optimized plan, which means the effects become worse.

The chrominance sample of the color-gamut cell that corresponds to point 32 is a greenish yellow color with 6 degrees of chroma. The chromaticity coordinates of original color is $(x_{c32}, y_{c32})$=(0.391, 0.446). The brightness is $Y_{c32}$=27 cd/m$^2$. The primary-color voltages of original color are $E_{rc32}$=2.11V, $E_{gc32}$=196V and $E_{bc32}$=0.42V. The actual-object samples in this color-gamut cell include orange, pineapple, rosy clouds, images of some certain kind of paper, fabric and architectures. After the experiment of evaluation of viewing effects, optimized chrominance parameters are determined. They are as follows: chromaticity coordinates is $(x_{CE32}, y_{CE32})$=(0.398, 0.440); brightness is $Y_{CE32}$=27 cd/m$_2$; optimized primary-color voltages are $E_{rCE32}$=2.28V, $E_{gCE32}$=1.92V and $E_{bCE32}$=0.43V; optimized compensation coefficients are $c_{r32}$=0.27, $c_{g32}$=-0.04 and $c_{b32}$=-0.23 (The red, green and blue primary-color voltages of 9300K plan are 1.79V, 2.00V and 0.56V, respectively.); the optimized compensation coefficient of brightness is $c_{Y32}$=0. After compensation, optimized parameters are realized and the color reproduction effects are as follows: compared with the original color samples, dominant wavelength is increased by 2 nm; chroma is unchanged; among the actual-object samples, fruits look more fresh and mature, other samples look more vivid and newer. Instead, the 9300K plan has the following effects: dominant wavelength is decreased by 7 nm; reproduced colors shift from yellow with a little bit of green to a color gamut of greenish yellow; chroma is decreased by 0.4 degrees. These effects are opposite to those of the optimized plan, which means the effects are worse.

The chrominance sample of the color-gamut cell that corresponds to point 33 is a yellowish green color with 5.8 degrees of chroma. The chromaticity coordinates of original color is $(x_{c33}, y_{c33})=(0.341, 0.432)$. The brightness is $Y_{c33}=31$ cd/m². The primary-color voltages of original color are $E_{rc33}=1.68V$, $E_{gc33}=2.46V$ and $E_{bc33}=0.84V$. The actual-object samples in this color-gamut cell include green plants such as grassland and forest, images of some certain kind of paper, fabric and architectures. After the experiment of evaluation of viewing effects, optimized chrominance parameters are determined. They are as follows: chromaticity coordinates is $(x_{CE33}, y_{CE33})=(0.320, 0.450)$; brightness is $Y_{CE33}=34$ cd/m₂; optimized primary-color voltages are $E_{rCE33}=1.29V$, $E_{gCE33}=2.87V$, $E_{bCE33}=0.87V$; optimized compensation coefficients are $c_{r33}=-0.10$, $c_{g33}=0.16$ and $c_{b33}=-0.22$ (The red, green and blue primary-color voltages of 9300K plan are 1.43V, 2.48V and 1.11V, respectively.); the optimized compensation coefficient of brightness is $c_{y33}=0.10$. After compensation, optimized parameters are realized and the color reproduction effects are as follows: comparing to original color samples, dominant wavelength is increased by 12 nm; chroma is increased by 1.5 degrees; brightness is increased by 15%; the reproduced actual objects look bright and beautiful; green plants look more fresh and flourishing, other samples look more vivid and newer. 9300K plan is better than D65 plan, while optimizing plan is better than 9300K plan.

The chrominance sample of the color-gamut cell that corresponds to point 34 is a red color with 7.8 degrees of chroma. The chromaticity coordinates of original color is $(x_{c34}, y_{c34})=(0.413, 0.329)$. The brightness is $Y_{c34}=20$ cd/m². The primary-color voltages of original color are $E_{rc34}=1.76V$, $E_{gc34}=0.59V$ and $E_{bc34}=0.59V$. The actual-object samples in this color-gamut cell include the rising sun, flame, flower, red flag, and images of some certain kind of paper, fabric and architectures. After the experiment of evaluation of viewing effects, optimized chrominance parameters are determined. They are as follows: chromaticity coordinates is $(x_{CE34}, y_{CE34})=(0.419, 0.325)$; brightness is $Y_{CE34}=23$ cd/m₂; optimized primary-color voltages are $E_{rCE34}=2.15V$, $E_{gCE34}=0.65V$ and $E_{bCE34}=0.69V$; optimized compensation coefficients are $c_{r34}=0.44$, $c_{g34}=0.08$ and $c_{b34}=-0.12$ (The red, green and blue primary-color voltages of 9300K plan are 1.50V, 0.60V and 0.78V, respectively.); the optimized compensation coefficient of brightness is $c_{y34}=0.16$. After compensation, optimized parameters are realized and the color reproduction effects are as follows: compared with the original color samples, dominant wavelength is basically unchanged; reproduced images approximately have the same color hues as the actual samples; chroma is increased by 0.4 degrees; brightness is increased by 16%; the actual-object samples look more vivid and newer. Instead, the 9300K plan has the following effects: dominant wavelength (complementary color wavelength) shifts to blue color with a relatively large extent; reproduced colors shift to a red color gamut with a little bit of purple; chroma is decreased by 1 degree. These effects are opposite to those of the optimized plan, which means the effects are worse.

The chrominance sample of the color-gamut cell that corresponds to point 35 is a purplish pink color with 12 degrees of chroma. The chromaticity coordinates of original color is $(x_{c35}, y_{c35})=(0.359, 0.245)$. The brightness is $Y_{c35}=20$ cd/m². The primary-color voltages of original color are $E_{rc35}=2.05V$, $E_{gc35}=0.46V$, $E_{bc35}=1.41V$. The actual-object samples in this color-gamut cell include flower, fruit, clothes, and images of some certain kind of paper, fabric and architectures. After the experiment of evaluation of viewing effects, optimized chrominance parameters are determined. They are as follows: chromaticity coordinates is $(x_{CE35}, y_{CE35})=(0.364\ 0.235)$; brightness is $Y_{CE35}=22$ cd/m₂; optimized primary-color voltages are $E_{rCE35}=2.47V$, $E_{gCE35}=0.44V$ and $E_{bCE35}=1.66V$; optimized compensation coefficients are $c_{r35}=0.42$, $c_{g35}=-0.08$, $c_{b35}=-0.12$ (The red, green and blue primary-color voltages of 9300K plan are 1.74V, 0.47V and 1.88V, respectively.); the optimized compensation coefficient of brightness is $c_{y35}=0.10$. After compensation, optimized parameters are realized and the color reproduction effects are as follows: compared with the original color samples, dominant wavelength (complementary color wavelength) is basically unchanged; reproduced images approximately have the same color hues as the actual samples; chroma is increased by 1.8 degrees; brightness is increased by 10%; the actual-object samples look more vivid and newer. Instead, the 9300K plan has the following effects: dominant wavelength (complementary color wavelength) shifts to blue color with a relatively large extent; reproduced colors shift from purplish pink color to purple color with red. These effects are opposite to those of the optimized plan, which means the effects are worse.

The chrominance sample of the color-gamut cell that corresponds to point 36 is a greenish blue color with 3 degrees of chroma. The chromaticity coordinates of original color is $(x_{c36}, y_{c36})=(0.270, 0.300)$. The brightness is $Y_{c36}=16$ cd/m². The primary-color voltages of original color are $E_{rc36}=1.00V$, $E_{gc36}=1.56V$, $E_{bc36}=2.00V$. The actual-object samples in this color-gamut cell include ocean, flower, clothes, images of some certain kind of paper, fabric and architectures. After the experiment of evaluation of viewing effects, optimized chrominance parameters are determined. They are as follows: chromaticity coordinates is $(x_{CE36}, y_{CE36})=(0.240, 0.276)$; brightness is $Y_{CE36}=17.6$ cd/m₂; optimized primary-color voltages are $E_{rCE36}=0.70V$, $E_{gCE36}=1.77V$ and $E_{bCE36}=2.72V$; optimized compensation coefficients are $c_{r36}=-0.18$, $c_{g36}=0.13$, $c_{b36}=0.03$ (The red, green and blue primary-color voltages of 9300K plan are 0.85V, 1.56V and 2.63V, respectively.); the optimized compensation coefficient of brightness is $c_{y36}=0.10$. After compensation, optimized parameters are realized and the color reproduction effects are as follows: compared with the original color samples, dominant wavelength is decreased by 2 nm, shifting to blue color slightly; the reproduction is pretty much the same as the actual color hues, though shifting to blue direction slightly; chroma is increased by 2.2 degrees; brightness is increased by 10%; the reproduced actual objects look cleaner, more crystal and newer. 9300K plan is better than $D_{65}$ plan, while the optimized plan is better than 9300K plan.

The chrominance sample of the color-gamut cell that corresponds to point 37 is a greenish yellow color with 5.5 degrees of chroma. The chromaticity coordinates of original color is $(x_{c37}, y_{c37})=(0.374, 0.431)$. The brightness is $Y_{c37}=20$ cd/m². The primary-color voltages of original color are $E_{rc37}=1.2V$, $E_{gc37}=1.2V$ and $E_{bc37}=0.36V$. The actual-object samples in this color-gamut cell include banana, mango, some matured crops, images of some certain kind of paper, fabric and architectures. After the experiment of evaluation of viewing effects, it's determined that optimized parameters are the same as original color parameters. Optimized compensation coefficients are $c_{r37}=0.17$, $c_{g37}=-0.02$ and $c_{b37}=-0.24$ (The red, green and blue primary-color voltages of 9300K plan are 1.02V, 1.22V and 0.47V, respectively.); the optimized compensation coefficient of brightness is $c_{y37}=0$. After compensation, optimized parameters are realized and the color reproduction effects are that color hues and brightness are reproduced exactly. Instead, the 9300K plan has the following effects: dominant wavelength is dramatically reduced by 8 nm; reproduced colors shift from greenish yellow color to the color gamut of green color close to yellow color; chroma is decreased by 0.5 degrees. Among actual-object samples, fruits and crops look immature and other yellow objects look greenish and their colors are not pure.

APPLICATIONS IN THE INDUSTRY

From above description it's clear that the present invention provides different optimized compensations to colorful images that belong to different color-gamut cells, according to experimental data from realization of the best viewing effects. The characteristic of this compensation is that each pixel gets its own amplification accordingly. This kind of dynamic combination makes the whole image and all images meet the requirement of best adaptive color reproduction. Consequently, color images with high qualities are obtained. Thanks to the application of adaptive chrominance compensation method and its relative compensation means, the colorful images displayed by the equipment are under the status with the best viewing effects. Thus, even if there is any chrominance shifting, the start point of the shifting is around this best status and the opportunity of going into the inferior chrominance distortion is consequently decreased dramatically. Therefore, not only the inevitable local inferior chrominance distortion of the prevent products can be eliminated, but also equipment's tolerance to the chrominance distortion of the signals can be improved. As a result, equipment's ability is improved to adapt to the receiving environments.

The invention claimed is:

1. An adaptive chrominance compensation method for the optimizing treatment of color images of electronic equipments, according to real-time recognition of primary-color voltages $E_r$, $E_g$ and $E_b$ in the signals of original equipment and the location of color-gamut cells they belong to, voltage compensation is then performed based on the preset adaptive corresponding relations and compensation parameters, so as to achieve the chrominance compensation for imaging colors, wherein said method comprising the following steps:

dividing all the colors that can be reproduced by the equipment into T color-gamut cells (42 and 46), according to certain multiples of the size of Macadam Ellipse, in CIE chromaticity diagram and rgb chromaticity diagram, selecting the color represented by the central point of color-gamut cell (42 and 46) as the chrominance sample ($S_{Cj}$) of this cell, and stipulating a white color-gamut cell $U_1$ as the cell whose chrominance sample is white light $D_{65}$ with correlated color-temperature 6500K+18MPCD Minimum Perceptible Color Difference;

acquiring actual-object samples and signals of actual-object samples that can reflect the color characteristics in the predetermined area of the cell for each color-gamut cell;

reproducing the same actual-object sample on the screens of testing equipments according to different chrominance characteristics, namely, color hues, chroma, brightness and background, carrying out the test for contrasting and evaluating the viewing effect of the images and choosing the most optimized image as the best color reproduction image of the actual-object sample; choosing the best image of color reproduction ($S_{OEj}$) from the optimized images of all the actual-object samples in the cell $U_j$ according to some predetermined rules; choosing the best image of color reproduction for each color-gamut cell in the same way; and using the optimized color of chrominance sample ($S_{OE1}$) that represents the best image of color reproduction in white color-gamut cell $U_1$ as optimized white reference $D_E$ for white balance;

testing the optimized compensation coefficients of primary-color voltages when the common image of actual-object sample ($S_{OCj}$) in color-gamut cell $U_j$ is converted into the optimized image among the actual-object samples ($S_{OEj}$) under the status of white balance $D_E$, wherein said coefficients are increasing rate $c_{rj}$ for red-primary-color voltage, increasing rate $c_{gj}$ for green-primary-color voltage and increasing rate $c_{bj}$ for blue-primary-color voltage and measuring the optimized compensation coefficients of primary-color voltages for all the T color-gamut cells;

setting the relationship of the optimized converting functions, which correspond to those optimized compensation coefficients of T groups of primary-color voltages, into fiducial-voltage generators or fiducial memories according to pre-acquired parameters of optimized white reference $D_E$ and said optimized compensation coefficients of each color-gamut cell (46), and performing adaptive compensation for each color-gamut cell (46) according to these optimized converting functions and different-amplification; recognizing the stochastic imaging signals received by the equipment in real time firstly and locating said signal to the color-gamut cell they belong to, in the application of the equipment, and then performing voltage compensation basing on preset optimized converting functions for this color-gamut cell.

2. The method according to claim 1, wherein each of said T color-gamut cells (46) is a small rectangular area whose sides are parallel to r axis and g axis of rgb chromaticiy diagram.

3. The method according to claim 1, wherein said test for contrasting and evaluating the viewing effect of the images further comprising the following steps:

having viewers to watch and remember the relative actual objects or original images before they take the contrast and evaluation test on the different images of the actual-object samples reproduced on equipment screens;

only selecting those images that approximately match with the viewers' memory colors as the candidates for the best image, and giving pleasure grades to each candidate, after the viewers watched the different images of the actual-object samples reproduced on the screen;

comparing each image with all other images that belong to the same color-gamut cell, and giving higher grade to the one that viewers feel more beautiful in every two comparing images;

selecting one of the images as the best image of color reproduction ($S_{OEj}$) for color-gamut cell $U_j$ from all the optimized images of actual-object samples in that color-gamut cell, according to the following preset rule: the image selected by this plan accords with the common accepted conclusions made by multiple disciplines such as psychology and physiology; it meets the requirements that correction needs to be done in order to eliminate the affections of contrast effect of apposition colors; the chrominance deviation of this plan is in the range of the preset acceptable errors; in addition to the above requirements, the image receives the highest grades during each comparison of pleasure grade.

4. The method according to claim 1, wherein said different-amplification adaptive compensation in each color-gamut cell (46) comprises at least two different parameters' optimized converting.

5. An adaptive chrominance compensation apparatus, which can optimize imaging colors of electronic equipments, according to real-time recognition of primary color voltages $E_r$, $E_g$, $E_b$ in the signals of original equipment and the location of color-gamut cells they belong to, voltage compensation is then performed based on the preset adaptive corresponding relations and compensation parameters, so as to achieve the chrominance compensation for imaging colors, wherein said apparatus comprising:

a color-gamut cells dividing and actual-object samples locating means for dividing all the colors that can be reproduced by the equipment into T color-gamut cells (46) in CIE chromaticity diagram and rgb chromaticity diagram, according to certain multiple of the size of Macadam Ellipse, establishing the relationship between the primary-color voltages $E_r$, $E_g$, $E_b$ of any signals and the color-gamut cell they belong to, locating this actual-object sample into the color-gamut cell it belongs to automatically according to the recognition results of each actual-object sample's primary-color voltages $E_r$, $E_g$ and $E_b$, and thus acquiring and storing the actual-object samples and their signals that can reflect the color characteristics in the predetermined area of the color-gamut cell;

a testing means for comparing, selecting and testing the actual-object samples for each and every color-gamut cell, so as to acquire the best image of color reproduction and optimized compensation coefficients for primary-color voltages for all the T color-gamut cells.

a compensation means for recognising in real time the primary-color voltages $E_r$, $E_g$, $E_b$ of stochastic imaging signals received by the electronic equipment and locating them automatically into the color-gamut cell they belong to according to said corresponding relationship between signal's primary-color voltages $E_r$, $E_g$, $E_b$ and the color-gamut cell they belong to as well as the corresponding relationship between color-gamut cell and optimized compensation coefficients, and performing the different-amplification adaptive compensation for each said color-gamut cell (46) according to said optimized converting functions of relative color-gamut cell.

6. The apparatus according to claim 5, wherein each of said T color-gamut cells (46) is a small rectangular area whose sides are parallel to r axis and g axis of rgb chromaticity diagram.

7. The apparatus according to claim 5, wherein said different-amplification adaptive compensation in each color-gamut cell (46) comprises at least two different parameters' optimized converting.

8. The apparatus according to claim 5, wherein said compensation means comprises several compensators (4, 6, 11, 13, 18 and 20) that are corresponding to all the optimized compensation coefficients.

9. The apparatus according to claim 5, wherein said compensation means also comprises:

an input circuit comprising transistors ($P_{r1}$, $P_{r2}$, $P_{g1}$, $P_{g2}$, $P_{b1}$, $P_{b2}$) and resistors ($R_{r1}$, $R_{g1}$, $R_{b1}$) for inputting the signals such as primary-color voltages ($E_r$, $E_g$, $E_b$) or color-minus-monochrome voltages (($E_r$-Y), ($E_g$-Y), ($E_b$-Y)), and inputting this group of signals into primary-color-voltage generator (9) and one end of each voltage-superposed resistor;

a zero-reference-voltage generator (16) for converting the input black-level signal or brightness signal into a zero-reference-voltage signal with the same amplitude as that of the zero-level of primary-color voltages and then sending it to primary-color-voltage generator (9);

a primary-color-voltage generator (9) for converting the input signal comprising primary-color voltages or color-minus-monochrome voltages and zero-reference-voltage into an accurate primary-color-voltage signal by subtraction operation and sending this primary-color voltage to recognition-voltage generator (2) and each compensator;

a recognition-voltage generator (2) for converting the input primary-color-voltage signal into a group of recognition signals with the information of proportions of primary colors and then sending them to each location controller;

location controllers (3, 5, 10, 12, 17 and 19) comprising fiducial-voltage generators or fiducial memories, comparison units and recognition units, which will compare the input recognition signals with the preset or pre-stored fiducial voltage, for locating the color-gamut cell $U_j$ to which this primary color proportion signal belongs according to the corresponding relationship between the primary color proportions and the color-gamut cell, and then corresponding location controllers outputting controlling signals and turning on a group of compensators that belong to the located color-gamut cell $U_j$, in which the outputs of this group of compensators are red-primary-color compensation current with value of $c_{rj}E_r/R_{r2}$, green-primary-color compensation current with value of $c_{gj}E_g/R_{g2}$ and blue-primary-color compensation current with value of $c_{bj}E_b/R_{b2}$, voltage-superposed resistors, comprising resisters $R_{r2}$, $R_{g2}$ and $R_{b2}$, getting a compensated red-primary-color voltage ($E_r$+$c_{rj}E_r$) at the end of resistor $R_{r2}$ where the output circuit is connected, by adding a compensation voltage $c_{rj}E_r$ across resistor $R_{r2}$ created by red-primary-color compensation current with said signal $E_r$ from the input circuit; getting a compensated green-primary-color voltage ($E_g$+$c_{gj}E_g$) at the end of resistor $R_{g2}$ where the output circuit is connected, by adding a compensation voltage $c_{gj}E_g$ across resistor $R_{g2}$ created by green-primary-color compensation current with said signal $E_g$ from the input circuit; and getting a compensated blue-primary-color voltage ($E_b$+$c_{bj}E_b$) at the end of resistor $R_{b2}$ where the output circuit is connected, by adding a compensation voltage $c_{bj}E_b$ across resistor $R_{b2}$ created by blue-primary-color compensation current with said signal $E_b$ from the input circuit;

an output circuit comprising transistors $N_r$, $N_g$ and $N_b$ and resistors $R_{r3}$, $R_{g3}$ and $R_{b3}$, forming three emitter-followers, outputting said compensated primary-color voltages.

* * * * *